US012551392B2

(12) United States Patent
Sears

(10) Patent No.: US 12,551,392 B2
(45) Date of Patent: Feb. 17, 2026

(54) FOOT SUPPORT DEVICE

(71) Applicant: James Jay Sears, Goodrich, MI (US)

(72) Inventor: James Jay Sears, Goodrich, MI (US)

( * ) Notice: Subject to any disclaimer, the term of this patent is extended or adjusted under 35 U.S.C. 154(b) by 0 days.

(21) Appl. No.: 18/235,057

(22) Filed: Aug. 17, 2023

(65) Prior Publication Data

US 2024/0148578 A1 May 9, 2024

Related U.S. Application Data

(60) Continuation of application No. 17/078,966, filed on Oct. 23, 2020, now Pat. No. 11,771,608, which is a continuation of application No. 16/784,886, filed on Feb. 7, 2020, now Pat. No. 10,864,129, which is a continuation of application No. 15/435,127, filed on Feb. 16, 2017, now Pat. No. 10,561,553, which is a continuation-in-part of application No. 14/725,760, filed on May 29, 2015, now abandoned, which is a division of application No. 13/959,025, filed on Aug. 5, 2013, now Pat. No. 9,066,598.

(51) Int. Cl.
*A61G 7/05* (2006.01)
*A47C 21/02* (2006.01)
*A61G 7/075* (2006.01)

(52) U.S. Cl.
CPC .......... *A61G 7/0501* (2013.01); *A47C 21/024* (2013.01); *A61G 7/0755* (2013.01)

(58) Field of Classification Search
CPC ... A61G 7/0501; A61G 7/0755; A47C 21/024
See application file for complete search history.

(56) References Cited

U.S. PATENT DOCUMENTS 2,105,336 A * 1/1938 Smith .................. A47C 20/027 5/52
2,589,155 A * 3/1952 Smith .................. B61D 33/005 156/251
2,710,646 A * 6/1955 Kirby ........................ A47C 7/42 297/352
4,440,443 A * 4/1984 Nordskog .............. B60N 2/882 297/217.4
5,114,111 A * 5/1992 Andrews .............. A47B 19/002 248/448
5,201,089 A * 4/1993 Ferreira ................... A61G 1/04 5/628
5,432,967 A * 7/1995 Raftery ................ A47C 16/005 D6/601

(Continued)

*Primary Examiner* — David E Sosnowski
*Assistant Examiner* — Ifeolu A Adeboyejo
(74) *Attorney, Agent, or Firm* — Larry E. Henneman, Jr.; Henneman & Associates, PLC

(57) ABSTRACT

A novel foot support device includes a first sidewall adapted to engage the lateral side of a first foot, a second sidewall adapted to engage the lateral side of a second foot, and a backwall adapted to engage both the plantar region of the first foot and the plantar region of the second foot. In a particular embodiment, the first sidewall includes an inclined interior surface, the second sidewall includes an inclined interior surface, and the backwall includes an inclined interior surface. In another particular embodiment, the foot support device includes sidewalls and a backwall that can flatten and pivot relative to one another, facilitating a collapsible foot support device.

20 Claims, 16 Drawing Sheets

(56) References Cited

U.S. PATENT DOCUMENTS

| | | | | | |
|---|---|---|---|---|---|
| 5,544,378 | A * | 8/1996 | Chow | A47C 7/383 | 5/640 |
| D390,298 | S * | 2/1998 | Ince | D6/601 | |
| 6,270,049 | B1 * | 8/2001 | Olvey | A47B 96/202 | 248/447 |
| 6,491,278 | B1 * | 12/2002 | Thomsen | A47B 23/042 | 108/43 |
| 6,536,803 | B2 * | 3/2003 | Masson | B42F 13/0006 | 248/460 |
| 7,334,768 | B1 * | 2/2008 | Lum | A47B 23/04 | 248/444 |
| 8,001,632 | B2 * | 8/2011 | Sanders | A61G 7/0501 | 5/505.1 |
| 8,256,985 | B2 * | 9/2012 | Ashmead | E01F 13/02 | 404/6 |
| 8,740,308 | B2 * | 6/2014 | Leywood | A47C 5/005 | 297/440.12 |
| 10,022,001 | B1 * | 7/2018 | Hawkins | A47G 9/1027 | |
| 2009/0235459 | A1 * | 9/2009 | Tidwell | A47G 9/10 | 5/655 |
| 2010/0319127 | A1 * | 12/2010 | Sanders | A61G 7/0501 | 5/505.1 |
| 2016/0029821 | A1 * | 2/2016 | Atkinson | A47G 9/1081 | 5/636 |
| 2016/0114708 | A1 * | 4/2016 | Spalter | A47C 7/383 | 297/397 |
| 2018/0049568 | A1 * | 2/2018 | Cruz | A47C 27/082 | |
| 2018/0111522 | A1 * | 4/2018 | Acevedo | B60N 2/882 | |
| 2019/0282008 | A1 * | 9/2019 | Choi | A47C 7/383 | |
| 2020/0077802 | A1 * | 3/2020 | Blanc | A47C 16/00 | |

* cited by examiner

FOOT SUPPORT DEVICE

RELATED APPLICATIONS

This application is a continuation of co-pending U.S. patent application Ser. No. 17/078,966, filed Oct. 23, 2020 by the same inventor, which is a continuation of U.S. patent application Ser. No. 16/784,886 (now U.S. Pat. No. 10,864,129), filed Feb. 7, 2020 by the same inventor, which is a continuation of U.S. patent application Ser. No. 15/435,127 (now U.S. Pat. No. 10,561,553), filed Feb. 16, 2017 by the same inventor, which is a continuation-in-part of U.S. patent application Ser. No. 14/725,760, filed May 29, 2015 by the same inventor, which is a divisional of U.S. patent application Ser. No. 13/959,025 (now U.S. Pat. No. 9,066,598), filed on Aug. 5, 2013 by the same inventor, all of which are incorporated herein by reference in their respective entireties.

BACKGROUND OF THE INVENTION

Field of the Invention

This invention relates generally to medical devices, and more particularly to a device for supporting and protecting feet.

Description of the Background Art

It is common for people to suffer from foot pain. Many conditions such as, for example, gout can cause pain so significant that the weight of bedding (i.e., sheets, blankets, etc.) on the feet can be unbearable. In effort to alleviate this pain, there are many devices intended to elevate bedding over feet.

U.S. Pat. No. 6,895,615 (Dilascio) discloses an in-bed tent frame designed to keep bedding off the toes of a person lying on his or her back on a standard bed. The frame includes a flat lower support frame which extends transversely across the bed between the mattress and box spring. The opposite ends of the lower support frame extend upward over the opposite sides of the mattress and connect to two hub assemblies. The two hub assemblies hold a support frame in a transversely aligned, elevated position over the mattress. Bedding placed over the upper support frame is then elevated over the user's feet when sleeping.

Although the device of U.S. Pat. No. 6,895,615 alleviates pain caused by the weight of bedding, there are disadvantages. For example, the in-bed tent frame of Dilascio provides no foot support. This is problematic for gout sufferers because joint movement is particularly painful. Another disadvantage is that the in-bed tent frame is inconvenient to use. That is, it has to be adjusted specifically to the size of the bed it is being used on. Furthermore, the mattress has to be lifted so that the flat lower support frame can be positioned between the bed spring and the mattress.

Previous devices designed to elevate bedding over feet are also disadvantageous, because they are not conveniently portable. For example, previous devices are bulky and either cannot fit into a suitcase or take up most of the room in the suitcase. This leaves a traveler with two options: bring additional luggage, which is inconvenient and can be expensive, or suffer from foot pain caused by non-elevated bedding.

What is needed, therefore, is a device that protects feet from bedding and also provides foot support. What is also needed is a device that is more convenient to use. What is also needed is a device that is readily portable.

SUMMARY

The present invention overcomes the problems associated with the prior art by providing a device that provides foot support and also protects feet from overhanging bedding. The present invention also overcomes the problems associated with the prior art by providing a conveniently portable foot support device.

The foot support includes a first sidewall, a second sidewall, a backwall, and a bottom surface. The first sidewall includes an interior surface disposed to engage the lateral side of a first foot of a user in a supine position. The second sidewall includes an interior surface disposed with respect to the first sidewall to engage the lateral side of a second foot of the user in the supine position. The backwall is disposed between the first sidewall and the second sidewall. The backwall includes an interior surface disposed to engage the plantar region of the first foot and the plantar region of the second foot of the user in said supine position. The bottom surface is coupled to the first sidewall, the second sidewall, and the backwall. Furthermore, the bottom surface is disposed to support the foot support device on a surface upon which the feet of the user are resting.

In an example embodiment, the foot support further comprises instructions to the user to position the feet of the user between the first sidewall and the second sidewall while in the supine position.

In another example embodiment, the first sidewall, the second sidewall, and the backwall are each a solid structure having a bottom surface. The bottom surfaces of the first sidewall, the second sidewall, and the backwall together form the bottom surface of the foot support device. In a more particular example, the bottom surface of the first sidewall, the bottom surface of the second sidewall, and the bottom surface of the backwall are coplanar.

In another example embodiment, the first sidewall, the second sidewall, and the backwall each include a hollow structure having a bottom edge. The bottom edges of the first sidewall, the second sidewall, and the backwall together form the bottom surface of the foot support device. In a more particular example, the bottom edges of the first sidewall, the second sidewall, and the backwall are coplanar.

In another example embodiment, the interior surface of the first sidewall faces toward the interior surface of the second sidewall and is inclined to face slightly upward to allow some abduction of one of said user's feet. Furthermore, the interior surface of the second sidewall faces toward the interior surface of the first sidewall and is inclined to face slightly upward to allow some abduction of the other of said user's feet. In a more particular example, the interior surface of the backwall is inclined to face slightly upward to allow some plantar flexion of the user's feet.

In yet another example embodiment, the first sidewall extends in a first direction, the second sidewall extends in a second direction, and the first direction and second direction are parallel. In a more particular example, the backwall extends in a third direction that is perpendicular to the first direction and the second direction.

In another particular example embodiment, the first sidewall, the second sidewall, and the backwall partially surround an open bottom region of the foot support device to allow the feet of the user to rest directly on the same surface that the foot support device rests on.

In another example embodiment, the first sidewall, the second sidewall, and the backwall are integral parts of a single body. In a more particular example, the foot support device is a foam structure. In an even more particular example, the foam structure is a molded foam structure. Alternatively, the foot support device can be a hollow polymeric structure.

In another example embodiment, the height of said first sidewall and said second sidewall is greater than the length of an adult human foot.

In yet another example embodiment, the foot support device is composed of a flexible and resilient material.

In yet another example embodiment, the foot support device includes a first discrete foot support and a second discrete foot support. The backwall includes a first region disposed on the first discrete foot support and a second region disposed on the second discrete foot support. The first sidewall is disposed on the first discrete foot support and the second sidewall is disposed on the second discrete foot support.

In another example embodiment, the foot support device further includes a removable cover.

In another example embodiment, the foot support device includes a first part and a separate second part. The backwall includes a first region disposed on the first part and a second region disposed on the second part. The first sidewall is disposed on the first part and the second sidewall is disposed on the second part. The first part and the second part adjustably engage one another to allow the distance between the first sidewall and second sidewall to be adjusted.

A method for manufacturing a foot support device is also disclosed. The method includes forming a first sidewall, forming a second sidewall, forming a backwall, forming a bottom surface, and coupling the first sidewall, the second sidewall, and the backwall to the bottom surface. The first sidewall includes an interior surface disposed to engage the lateral side of a first foot of a user in a supine position. The second sidewall includes an interior surface disposed to engage the lateral side of a second foot of the user in the supine position. The backwall is disposed between the first sidewall and the second sidewall. The backwall includes an interior surface disposed to engage the plantar region of the first foot of the user and the plantar region of the second foot of the user. The bottom surface is disposed to support the foot device on a surface upon which the feet of the user are resting.

In a particular example, the method further includes providing instructions to the user to position the feet of the user between the first sidewall and the second sidewall while in the supine position.

In a more particular example method, the step of forming the bottom surface includes forming the first sidewall, the second sidewall, and the backwall each as a solid structure having a bottom surface. The method further includes coupling the bottom surfaces of the first sidewall, the second sidewall, and the backwall together to form the bottom surface of the foot support device. In an even more particular example method, the steps of forming the bottom surface of the first sidewall, the bottom surface of the second sidewall, and the bottom surface of the backwall include forming the bottom surface of the first sidewall, the bottom surface of the second sidewall, and the bottom surface of the backwall to be coplanar.

In another particular example method, the steps of forming the first sidewall, the second sidewall, and the backwall include forming a hollow structure having a bottom edge. Furthermore, the step of forming the bottom surface of the foot support device includes forming the bottom edges of the first sidewall, the second sidewall, and the backwall. In a more particular example method, the steps of forming the bottom edges of the first sidewall, the second sidewall and the backwall include forming the bottom edges of the first sidewall, the second sidewall, and the backwall to be coplanar.

In another particular example method, the step of forming the first sidewall includes forming the interior surface of the first sidewall to face toward the interior surface of the second sidewall and to be inclined to face slightly upward to allow some abduction of one of the user's feet. Furthermore, the step of forming the second sidewall includes forming the interior surface of the second sidewall to face toward the interior surface of the first sidewall and to be inclined to face slightly upward to allow some abduction of the other of the user's feet. In an even more particular example, the step of forming the backwall includes forming the interior surface of the backwall to be inclined to face slightly upward to allow some plantarflexion of the user's feet.

In another particular example method, the step of forming the first sidewall includes forming the first sidewall to extend in a first direction and the step of forming the second sidewall includes forming the second sidewall to extend in a second direction parallel to the first direction. In a more particular example, the step of forming the backwall includes forming the backwall to extend in a third direction that is perpendicular to the first direction and the second direction.

In another particular example method, the steps of forming the first sidewall, the second sidewall, and the backwall include forming the first sidewall, the second sidewall, and the backwall to partially surround an open bottom region of the foot support device. This allows the feet of the user to rest directly on the same surface that the foot support device rests on.

In another particular example method, the steps of forming the first sidewall, the second sidewall, and the backwall include forming the first sidewall, the second sidewall, and the backwall into a single body. In a more particular example, the steps of forming the first sidewall, the second sidewall, and the backwall include forming a foam structure. In an even more particular example, the step of forming the foam structure includes molding the foam structure. In another more particular example, the steps of forming the first sidewall, the second sidewall, and the backwall include forming a hollow polymeric structure.

In another particular example method, the step of forming the first sidewall and the step of forming the second sidewall include forming the first sidewall and the second sidewall to have a height that is greater than the length of an adult human foot.

In another particular example, the method further comprises forming the foot support device from a flexible and resilient material.

In another particular example method, the step of forming the first sidewall includes forming a first discrete foot support. The step of forming the second sidewall includes forming a second discrete foot support. The step of forming the backwall includes forming a first region of the backwall on the first discrete foot support and a second region of the backwall on the second discrete foot support.

In yet another particular example, the method further includes providing a removable cover and disposing the first sidewall, the second sidewall, and the backwall in the removable cover.

In yet another particular example, the method further includes forming a first part of the foot support device and forming a second part of the foot support device. The step of forming the backwall includes forming a first region of the backwall on the first part and forming a second region of the backwall on the second part. The step of forming the first sidewall includes forming the first sidewall on the first part. The step of forming the second sidewall includes forming the second sidewall on the second part. Finally, the steps of forming the first part and the second part include forming the first part and the second part to adjustably engage one another.

Foot support devices having collapsed configurations and expanded configurations are also disclosed. An exemplary collapsible foot support device includes a backwall, a first sidewall movably coupled to the backwall, and a second sidewall movably coupled to the backwall such that the backwall is disposed between the first and second sidewalls. The backwall has an interior surface disposed to engage the plantar regions of a first foot and a second foot of a user in a supine position when the foot support device is in an expanded configuration. The first sidewall also has an interior surface disposed to engage the lateral side of the first foot of the user in the supine position when the foot support device is in the expanded configuration. Similarly, the second sidewall has an interior surface disposed to engage the lateral side of the second foot of the user in the supine position when the foot support device is in the expanded configuration.

In an example embodiment, the first sidewall and the second sidewall pivot relative to the backwall when the foot support device transitions from the expanded configuration to the collapsed configuration, and vice-versa. In a more particular example embodiment, a first angle between the backwall and the interior surface of the first sidewall is smaller when the foot support device is in the collapsed configuration than in the expanded configuration. Similarly, a second angle between the backwall and the interior surface of the second sidewall is smaller when the foot support device is in the collapsed configuration than in the expanded configuration.

In another example embodiment, at least one of the first sidewall and the second sidewall comprises a plurality of sidewall panels movably coupled together. In a particular example embodiment, the plurality of sidewall panels comprises a first sidewall panel defining the interior surface of one of the first sidewall and the second sidewall, and a second sidewall panel movably coupled to the first sidewall panel, where the second sidewall panel defines an exterior surface of the one of the first sidewall and the second sidewall. In a more particular example embodiment, the backwall comprises a plurality of backwall panels, including a first backwall panel and a second backwall panel. The first backwall panel defines the interior surface of the backwall and is movably coupled to the first sidewall panel of the plurality of sidewall panels. The second backwall panel defines an exterior surface of the backwall and is movably coupled to both the first backwall panel and to the second sidewall panel.

In another particular example embodiment, the plurality of sidewall panels has a triangular cross-section when the foot support device is in the expanded configuration and a kite-shaped cross-section when the foot support device is in the collapsed configuration.

In still another particular example embodiment, the plurality of sidewall panels further comprises a third sidewall panel movably coupled between the first sidewall panel and the second sidewall panel, where the third sidewall panel defines at least a portion a bottom surface of the one of the first sidewall and the second sidewall. The plurality of sidewall panels can still further include a fourth sidewall panel movably coupled to the third sidewall panel, wherein the third and fourth sidewall panels define a substantially planar bottom surface when the foot support device is in the expanded configuration, but are disposed in a folded configuration when the foot support device is in the collapsed configuration.

In yet another particular example embodiment, the plurality of sidewall panels further comprises a first distal panel movably coupled to a distal edge of one of the first sidewall panel and the second sidewall panel. In a more particular embodiment, the plurality of sidewall panels further comprises a second distal panel movably coupled to the first distal panel and to a distal edge of the other of the first and second sidewall panels. The first distal panel and the second distal panel are substantially co-planar when the foot support device is in the expanded configuration and have a folded arrangement when the foot support device is in the collapsed configuration.

In still another particular example embodiment, the foot support device further includes a retainer selectively coupled between the first sidewall panel and the second sidewall panel. The retainer maintains the first sidewall panel and the second sidewall panel a predetermined distance apart when the foot support device is in the expanded configuration.

In another example embodiment, the backwall of the foot support device comprises a plurality of backwall panels movably coupled together. In a more particular example, the plurality of backwall panels includes a first backwall panel defining the interior surface of the backwall and a second backwall panel movably coupled to the first backwall panel, the second backwall panel defining an exterior surface of the backwall. In an even more particular example, the plurality of backwall panels also includes a third backwall panel movably coupled to the first backwall panel and a fourth backwall panel movably coupled to the third backwall panel and to the second backwall panel. The third and fourth backwall panels define a substantially planar bottom surface of the backwall when the foot support device is in the expanded configuration but are disposed in a folded arrangement when the foot support device is in the collapsed configuration.

In another example embodiment, the first sidewall comprises a first plurality of panels movably coupled together by a first set of movable joints, the second sidewall comprises a second plurality of panels moveably coupled together by a second set of movable joints, and the backwall comprises a third plurality of panels movably coupled together by a third set of movable joints. In a more particular example, the first plurality of panels is movably coupled to the third plurality of panels by a fourth set of movable joints, and the second plurality of panels is movably coupled to the third plurality of panels by a fifth set of movable joints. In some embodiments, at least one of the movable joints comprises a flexible adhesive sheet. In other embodiments, at least one of the movable joints comprises a hinge.

In still another example embodiment, the foot support device comprises instructions to the user indicating how to selectively configure the first sidewall, the second sidewall, and the backwall in the expanded configuration or the collapsed configuration.

Thus, the invention provides a collapsible foot support device including a first sidewall, a second sidewall, and a backwall, and which further includes means for transitioning (e.g., movable joints, multi-panel structures, etc.) the backwall, the first sidewall, and the second sidewall between their respective expanded configurations and collapsed configurations.

An exemplary method according to the invention for manufacturing a foot support device having a collapsed configuration and an expanded configuration includes the steps of forming a first sidewall, forming a second sidewall, forming a backwall, movably coupling the first sidewall to the backwall, and movably coupling the second sidewall to the backwall such that the backwall is disposed between the first sidewall and the second sidewall. The first sidewall has an interior surface adapted to engage the lateral side of a first foot of a user in a supine position when the foot support device is in the expanded configuration, and similarly, the second sidewall has an interior surface adapted to engage the lateral side of a second foot of the user in the supine position when the foot support device is in the expanded configuration. Additionally, the backwall has an interior surface adapted to engage the plantar regions of the first foot and the second foot of the user in the supine position when the foot support device is in the expanded configuration.

In a particular example method, the first sidewall and the second sidewall are pivotally coupled to the backwall such that the first sidewall and the second sidewall pivot relative to the backwall when the foot support device transitions from the expanded configuration to the collapsed configuration, and vice-versa.

In another particular example method, the step of forming the first sidewall comprises providing a first plurality of panels, the step of forming the second sidewall comprises providing a second plurality of panels, and the step of forming the backwall comprises providing a third plurality of panels. In a more particular example method, the step of forming the first sidewall further comprises assembling the first plurality of panels via a first set of movable joints to form the first sidewall, the step of forming the second sidewall further comprises assembling the second plurality of panels via a second set of movable joints to form the second sidewall, and the step of forming the backwall further comprises assembling the third plurality of panels via a third set of movable joints to form the backwall. In a still more particular method, the step of movably coupling the first sidewall to the backwall comprises movably coupling at least some of the first plurality of panels to at least some of the third plurality of panels via a fourth set of movable joints, and the step of movably coupling the second sidewall to the backwall comprises movably coupling at least some of the second plurality of panels to at least some of the third plurality of panels via a fifth set of movable joints.

In yet another example method, at least one of the first sidewall, the second sidewall, and the backwall comprises a plurality of panels interconnected via a set of movable joints, and at least one of the steps of forming the first sidewall, forming the second sidewall, and forming the backwall comprises assembling the plurality of panels via the set of movable joints. According to some methods, the set of movable joints comprises flexible adhesive sheet material, and the step of assembling the plurality of panels comprises movably coupling ones of the plurality of panels together using the flexible adhesive sheet material. In other methods, the set of movable joints comprises at least one hinge disposed between the plurality of panels, and the step of assembling the plurality of panels comprises movably coupling ones of the plurality of panels together via the at least one hinge.

Still another particular method includes the step of providing instructions to the user indicating how to selectively configure the foot support device in the expanded configuration and in the collapsed configuration

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a foot support device operative to provide foot support and provide protection from overhanging bedding. Additionally, some embodiments of the foot support device are readily collapsible. The foot support devices of the present invention can be used universally with any type of bed, because the foot support rests on the top surface of the mattress of the bed. In the following description, numerous specific details are set forth (e.g. material types) in order to provide a thorough understanding of the invention. Those skilled in the art will recognize, however, that the invention may be practiced apart from these specific details. In other instances, details of well-known manufacturing practices (e.g. foam molding) and components have been omitted, so as not to unnecessarily obscure the present invention.

Figure 1:
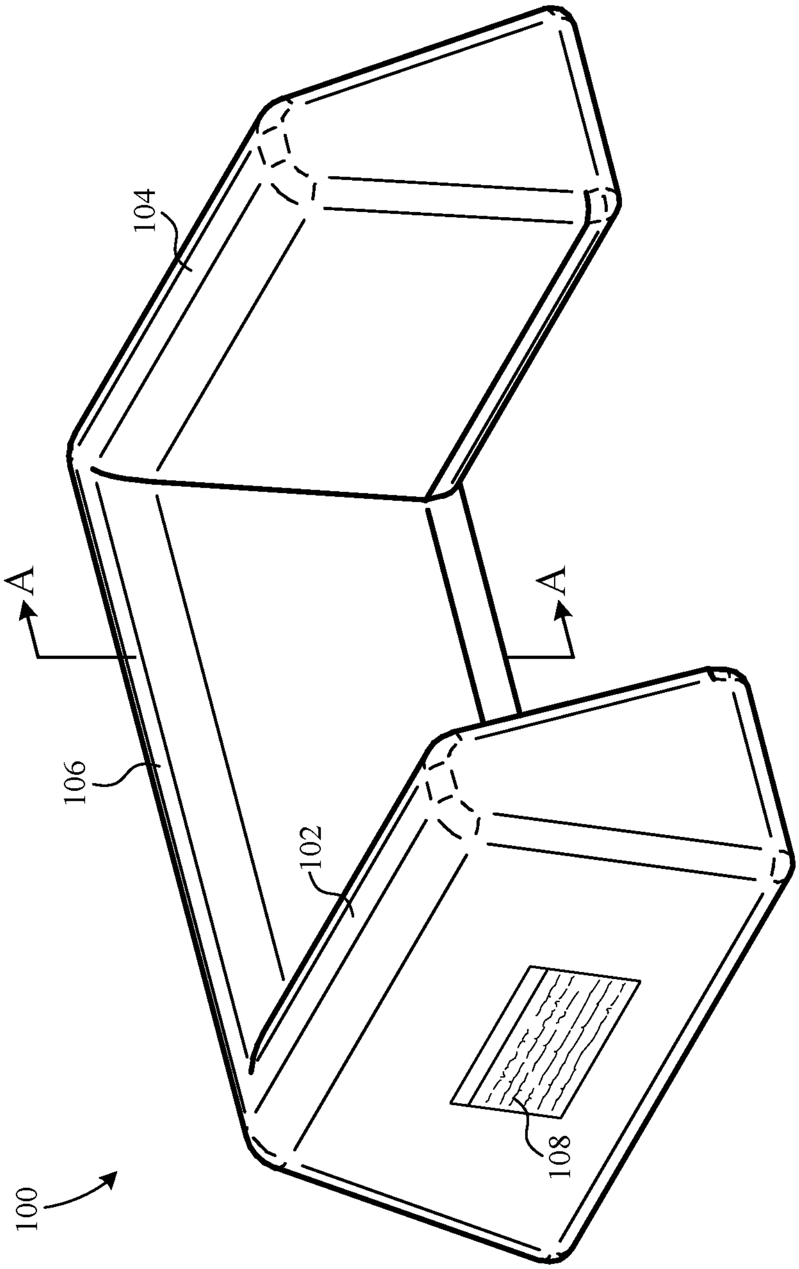
FIG. 1 is a perspective view of a foot support device.

FIG. 1 is a perspective view of a foot support device 100 according to one embodiment of the present invention. Foot support 100 is intended to alleviate pain associated with foot problems including, but not limited to, gout, burns, sprains, abrasions, broken bones, etc. Foot support 100 provides two main functions. One such function is to limit the motion of a user's feet. Another function is to protect the user's feet from contact with bedding (e.g., blankets, sheets, etc.) draped over the user's feet. In this particular embodiment, foot support 100 is formed, for example, by molding resilient foam into a single integral body. As shown, foot support includes a first sidewall 102 and a second sidewall 104 joined together by a backwall 106. Sidewall 102, sidewall 104 and backwall 106 define a volume for receiving the feet of a user, while the user is lying supine on the same surface upon which foot support device 100 is resting. The ends of sidewalls 102 and 104 define an opening through which the user's legs pass in order to position the feet within the volume defined by sidewalls 102 and 104 and backwall 106.

As used herein, the term "supine position" includes any sitting, lying, or reclined position, wherein the feet are positioned with the heels resting on a surface with the toes pointing upward. Examples of being in a supine position include, but are not limited to lying flat one one's back in a bed, lying in a reclined position in an adjustable bed, and sitting in a chair with one's feet resting on an ottoman.

Foot support device 100 further includes user instructions 108 attached thereto. In this particular embodiment, user instructions 108 is printed on a label attached to wall 102. User instructions 108 include text instructing the user to place foot support device 100 on a suitable surface (e.g., mattress, sofa cushion, etc.) position the user's feet within foot support device 100, and pull any bedding being used (e.g., sheet, blanket, etc.) over foot support device 100. In placing feet in foot support device 100, the user is instructed to position the plantar regions of both feet close to or against wall 106 such that the outside of the left and right foot are supported by walls 102 and 104, respectively.

Although user instructions 108 are depicted as being text printed on a label that is permanently attached to foot support device 100, it should be understood that user instructions 108 can be presented to the user in any effective form. For example, the text of user instructions 108 can be printed or molded directly on foot support device 100. Alternatively, user instructions 108 could be separate from foot support device 100 on, for example, a user instructions sheet that is placed in the packaging of foot support device 100 by the manufacturer. As yet another example, user instructions can be communicated orally to a user by, for example, a health care assistant.

Figure 2:
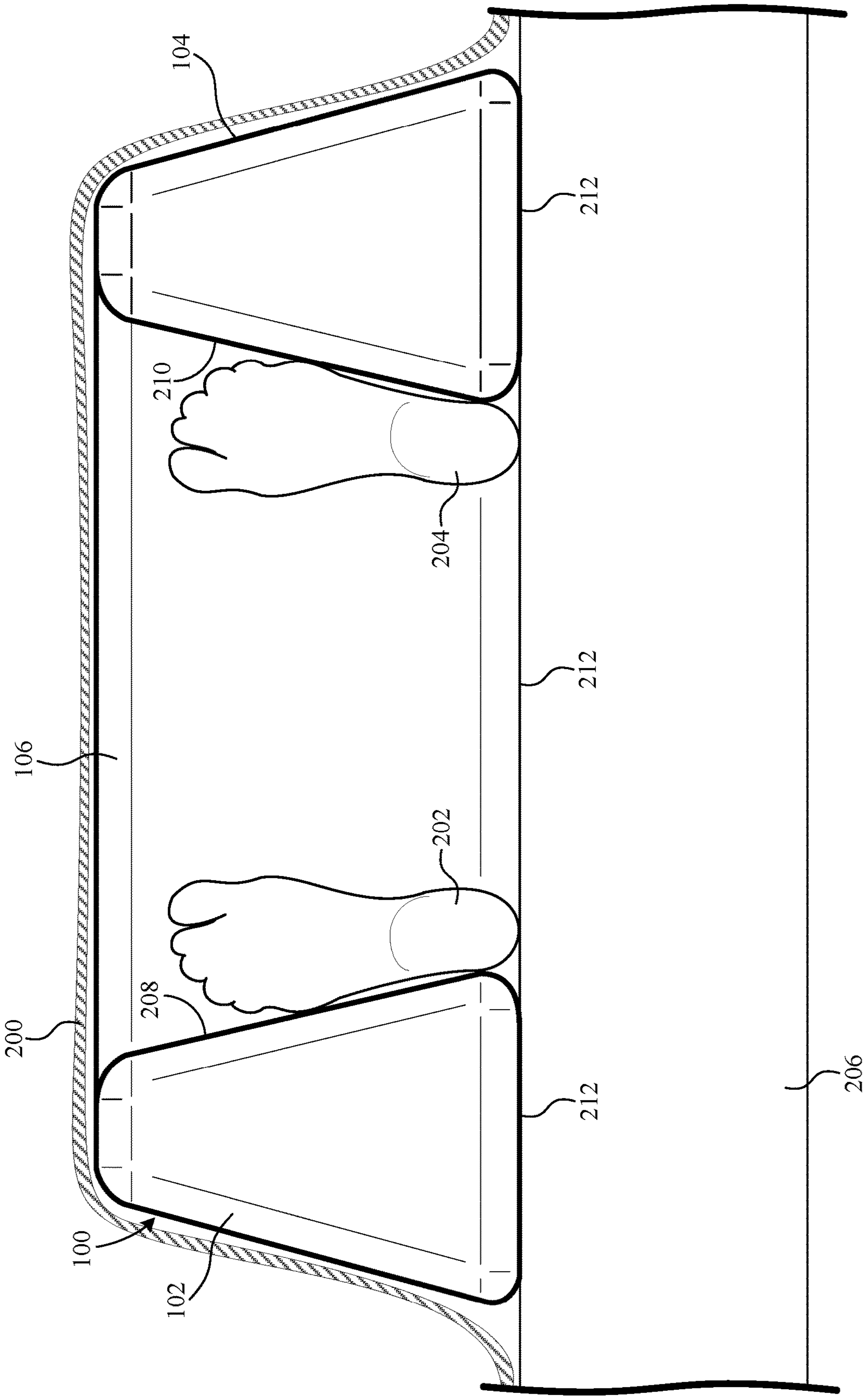
FIG. 2 is a front view of the foot support device of FIG. 1.

FIG. 2 is a front view of foot support device 100 shown suspending a bed sheet 200 over the left foot 202 and the right foot 204 of a user lying on a mattress 206. As shown, the height of sidewall 102, sidewall 104, and backwall 106 is sufficiently greater than the lengths of a user's feet 202 and 204. This prevents bed sheet 200 from draping down and contacting feet 202 and 204.

The average length of an adult human foot is about 11 inches, and one of the longest human feet ever recorded was about 18 inches. Therefore, making sidewalls 102 and 104 and backwall 106 at least 18 inches high would be sufficient for virtually all users. However, foot support devices of various heights can be provided, so that each user can obtain a foot support device of an appropriate size, thereby avoiding unnecessary height.

In addition to preventing bed sheet 200 from contacting feet 202 and 204, foot support 100 also minimizes pain by supporting feet 202 and 204. That is, sidewall 102 includes an interior surface 208 that supports foot 202 and sidewall 104 includes an interior surface 210 that supports foot 204. Interior surface 208 is slightly inclined so as to comfortably engage the lateral side of foot 202. With the lateral side of foot 202 engaged by interior surface 208, excessive abduction (e.g., outward rotation) of foot 202 is prevented. Likewise, interior surface 210 is slightly inclined so as to comfortably engage the lateral side of foot 204. Again, with the lateral side of foot 204 engaged by interior surface 210, excessive abduction of foot 204 is prevented.

Foot support 100 also includes a bottom surface 212 that is adapted to rest on any desirable surface such as, for example, the top of mattress 206. Unlike many prior art devices, the operation of foot support 100 does not depend on the object or surface it rests on. Instead, foot support 100 is adapted for use almost anywhere, including, but not limited to, a bed, a gurney, a sofa, a floor, an ottoman, etc.

Figure 3:
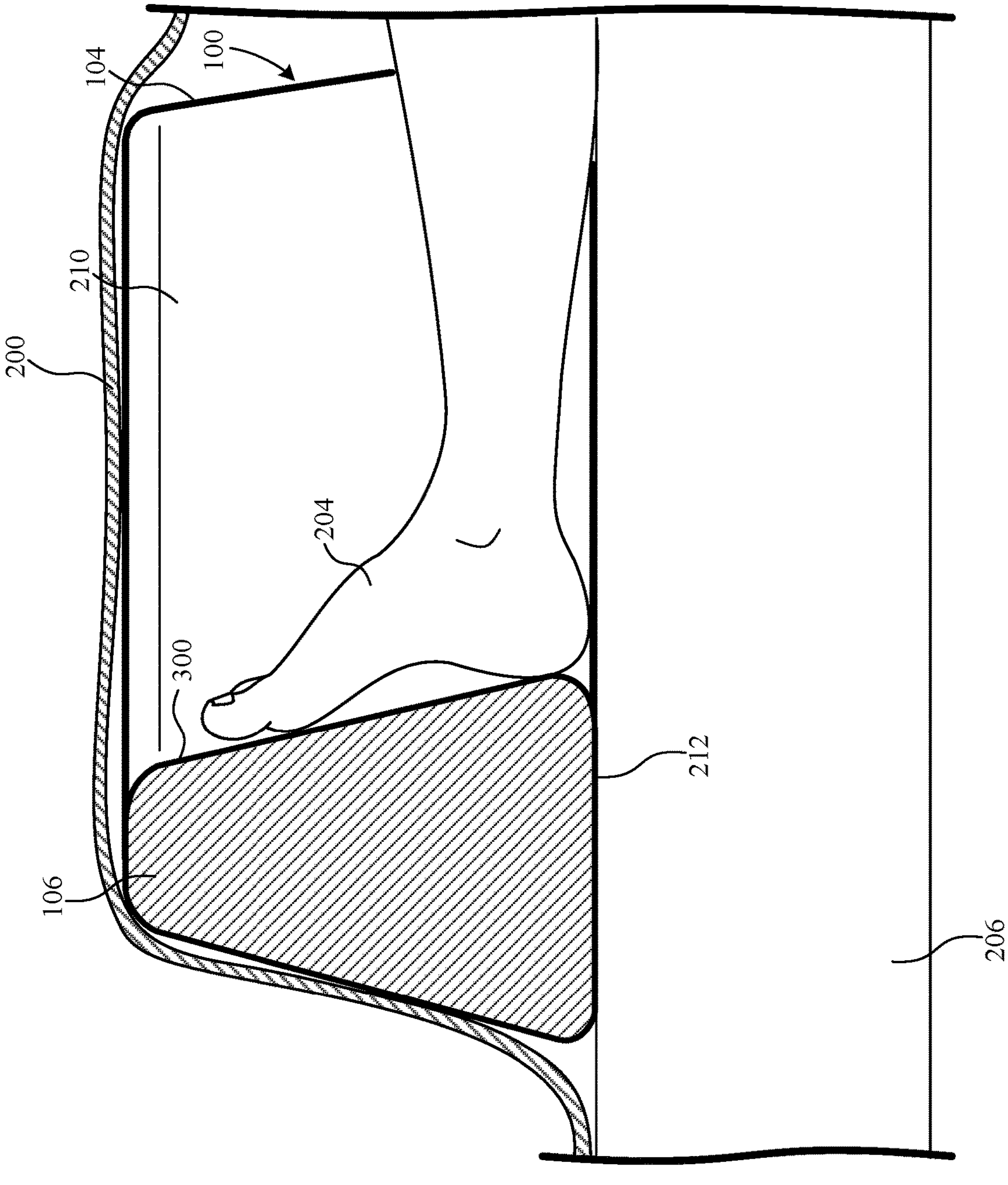
FIG. 3 is a cross sectional side view of the foot support device of FIG. 1.

FIG. 3 is a cross-sectional view of foot support 100 taken along line A-A of FIG. 1. Backwall 106 supports both the left foot 202 and the right foot 204 (only right foot 204 shown). More specifically, backwall 106 includes an interior surface 300 that is adapted to engage the plantar regions of both feet 202 and 204 simultaneously. As shown, interior surface 300 is slightly inclined so as to prevent excessive plantarflexion of feet 202 and 204.

Figure 4:
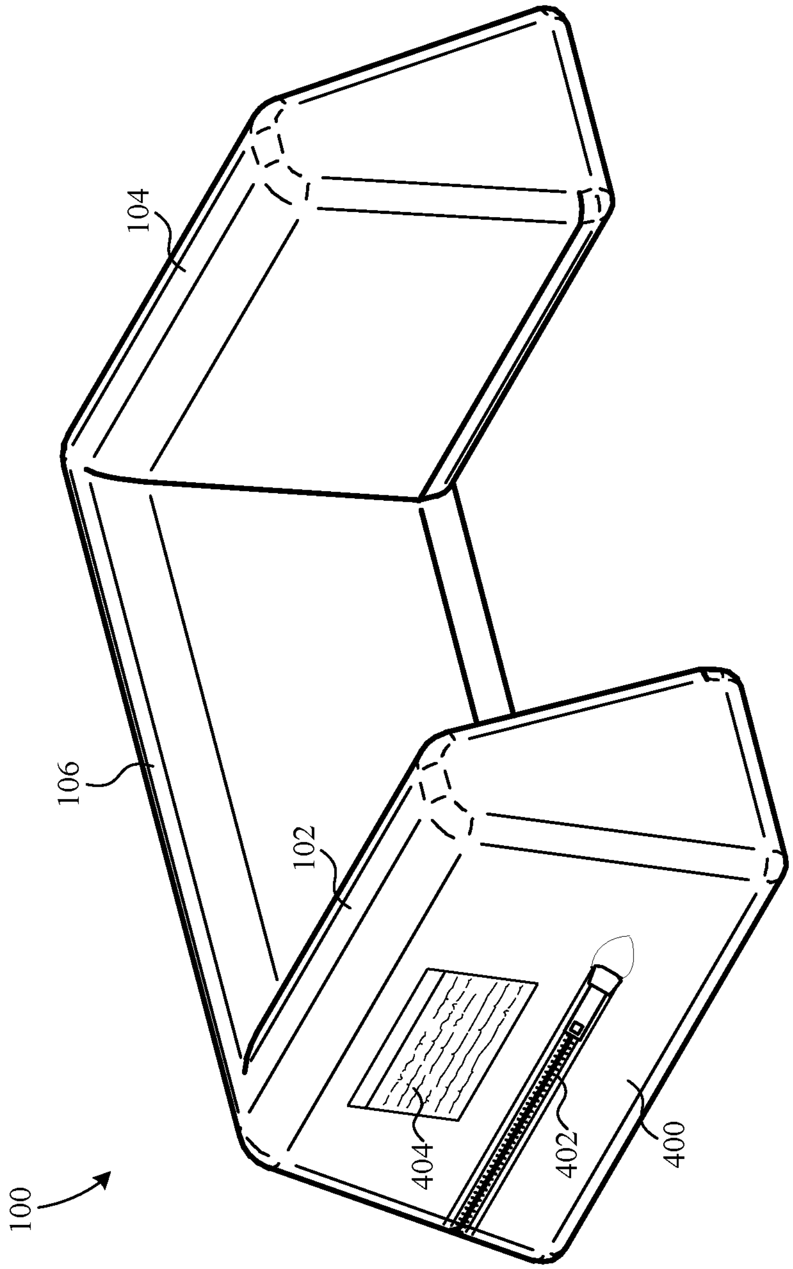
FIG. 4 is a perspective view of the foot support device of FIG. 1 disposed in a cover.

FIG. 4 shows a perspective view of foot support 100 disposed within a removable cover 400. In this example, cover 400 includes a zipper 402 to facilitate the securing of cover 400 onto foot support 100. However, those skilled in the art will recognize that cover 400 could include any suitable fastening device (e.g., hook and loop fastener, snap fasteners, etc.) to secure cover 400 onto foot support 100. Although not necessary, either foot support 100 and/or cover 400 could be formed from hypoallergenic materials (e.g., latex-free fabrics, latex free foams, etc.).

In this particular embodiment, cover 400 includes user instructions 404 which, in the example embodiment, are in the form of a label attached to cover 400 by some suitable means such as, for example, stitching, adhesive, etc. Like user instructions 108, user instructions 404 can be presented to the user in any of several various forms including, but not limited to, text printed on cover 400, a label attached to cover 400, a separate sheet of paper having user instructions printed thereon, orally, etc.

Figure 5:
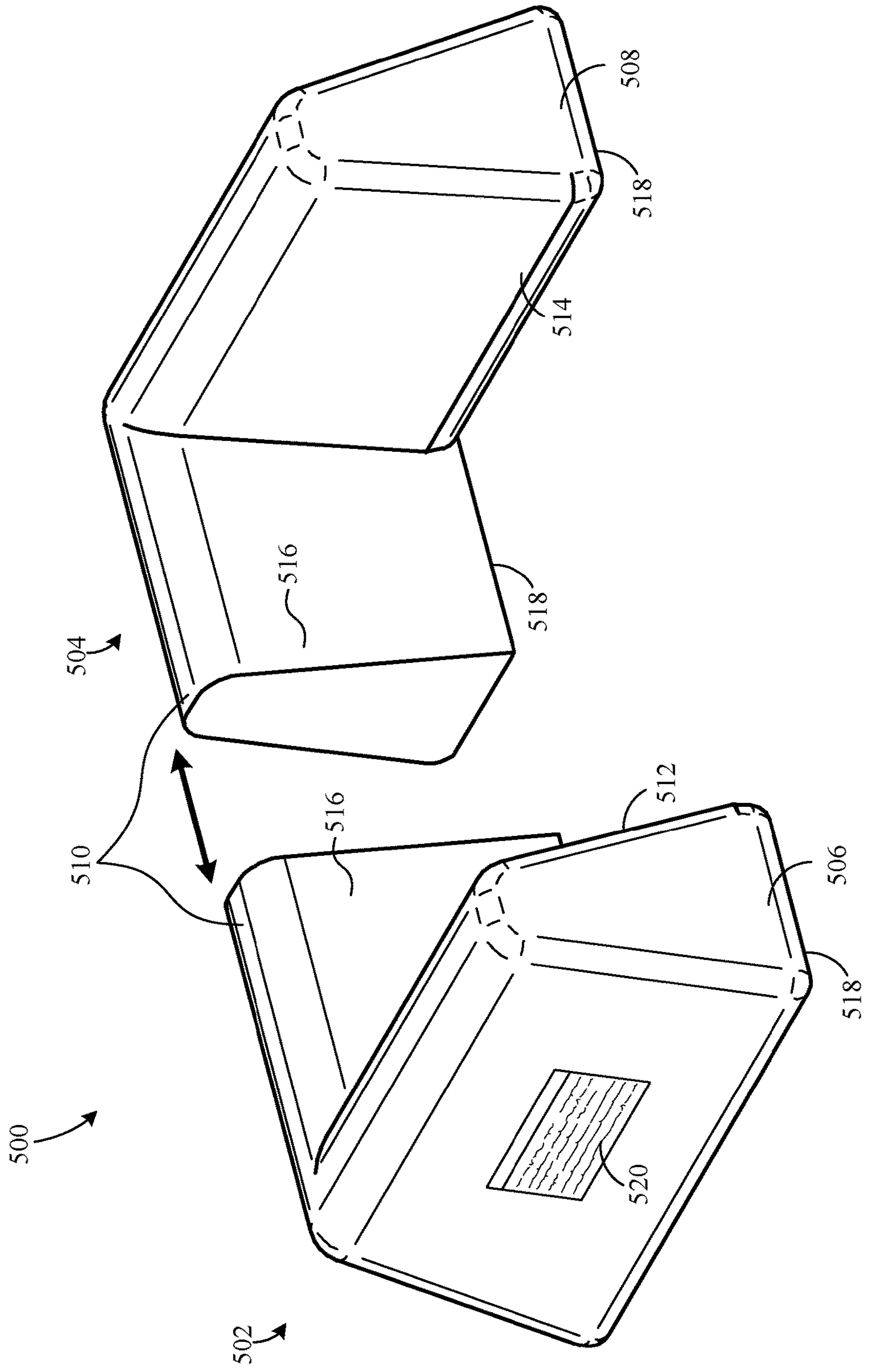
FIG. 5 is a perspective view of an alternate foot support device.

FIG. 5 shows a perspective view of a foot support 500 according to an alternate embodiment of the present invention. In this particular embodiment, foot support 500 is substantially similar to foot support 100 except that foot support 500 is formed from two discrete parts 502 and 504. Because foot support 500 is made up of two discrete parts 502 and 504, it can be adjusted to any desirable width simply by moving parts 502 and 504 toward or away from one another according to user preference. Parts 502 and 504 are operative to support the left and right feet, respectively, of a user. Furthermore, parts 502 and 504 are operative to, together, prevent bedding from contacting the feet of a user.

Foot support 500 includes a first sidewall 506 and a second sidewall 508 connected to opposite sides of a split backwall 510. First sidewall 506 includes an interior surface 512 that is adapted to engage the lateral side of a left foot. As shown, interior surface 512 is inclined so as to prevent excessive abduction of a user's left foot. Second sidewall 508 also includes an interior surface 514 that is adapted to engage the lateral side of a right foot. As shown, interior surface 514 is inclined so as to prevent excessive abduction of a user's right foot. Backwall 510 includes an interior surface 516 that is adapted to engage the plantar region of both the left and right foot of the user. Interior surface 516 is also inclined so as to prevent excessive plantarflexion of both the user's left and right foot. Foot support 500 also includes a bottom surface 518 that is adapted to rest on any desirable surface such as, for example, the top of a mattress.

In this particular embodiment, foot support 500 includes user instructions 520 which, in the example embodiment, are in the form of a label attached the outside of part 502 by some suitable means such as, for example, stitching, adhesive, etc. Like user instructions 108 and 404, user instructions 520 can be presented to the user in various forms including, but not limited to, text printed on part 502, a label attached to part 502, a separate sheet of paper having user instructions printed thereon, orally, etc.

Figure 6:
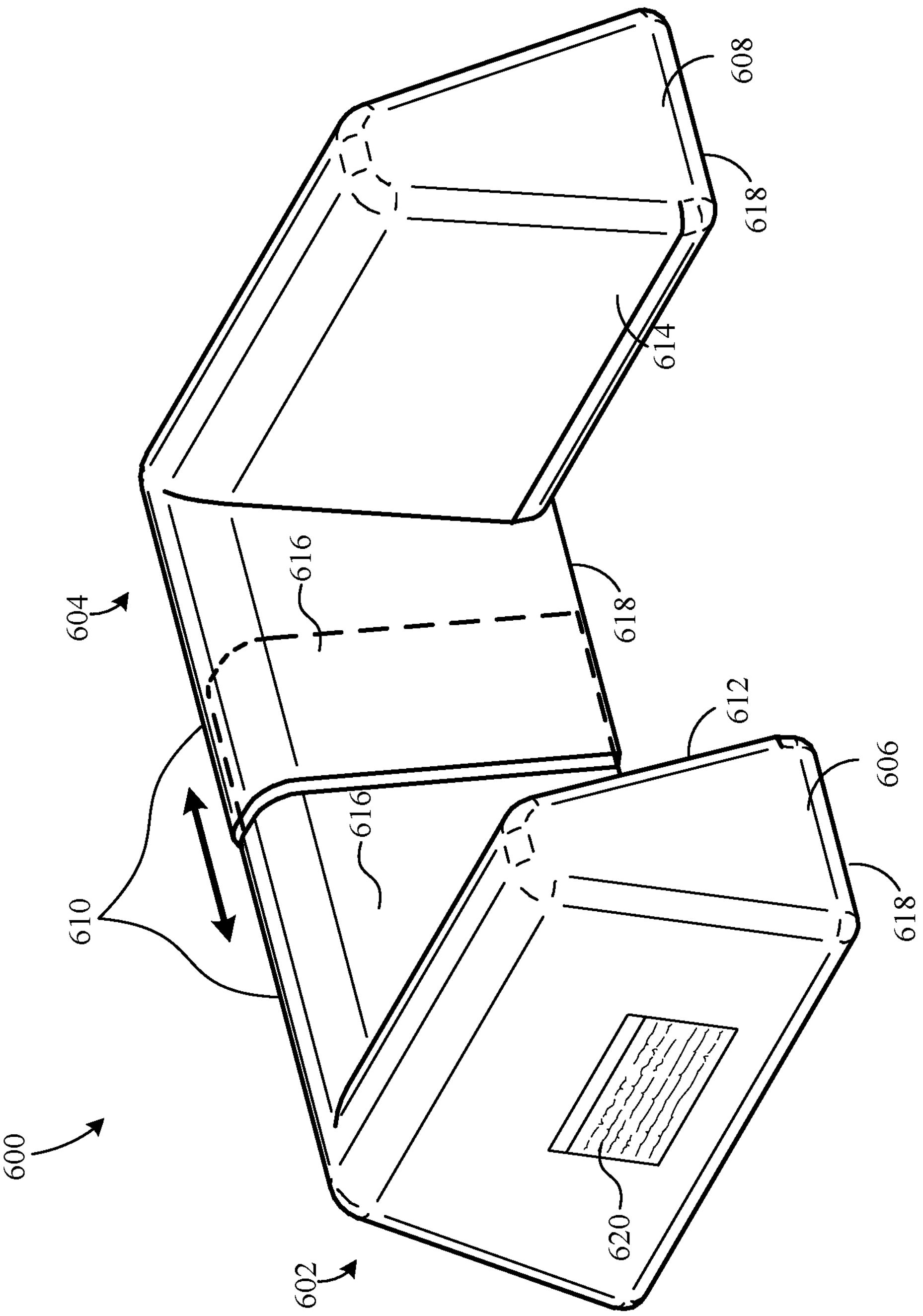
FIG. 6 is a perspective view of another alternate foot support device.

FIG. 6 shows a perspective view of a foot support device 600 according to an alternate embodiment of the present invention. In this particular embodiment, foot support device 600 is substantially similar to foot support device 500 except that foot support device 600 is formed from two discrete parts 602 and 604 that are slidably coupled to one another in a telescoping fashion. Because foot support device 600 is made up of two discrete telescoping parts 602 and 604, it can be adjusted to any desirable width simply by moving part 602 into and out of part 604 according to user preference and/or medical advice. Optionally, a fastening mechanism (not shown) can be provided to maintain parts 602 and 604 in place with respect to one another after they are properly adjusted. Examples of suitable fastening mechanisms include, but are not limited to, complementary engaging structures or a frictional fit between parts 602 and 604. Parts 602 and 604 are operative together to support the left and right feet of a user and to prevent bedding from contacting the user's feet.

Foot support device 600 includes a first sidewall 606 and a second sidewall 608 connected to opposite sides of a telescoping backwall 610. First sidewall 606 includes an interior surface 612 that is adapted to engage the lateral side of a left foot. As shown, interior surface 612 is inclined slightly, to support the user's foot in a comfortable position, yet prevent excessive abduction of the user's left foot. Second sidewall 608 also includes an interior surface 614 that is adapted to engage the lateral side of a right foot. As shown, interior surface 614 is inclined slightly to support the user's right foot in a comfortable position, yet prevent excessive abduction of the user's right foot. Backwall 610 includes an interior surface 616 that is adapted to engage the plantar region of both the left and right foot of the user. Interior surface 616 is also inclined to allow some, but prevent excessive, plantarflexion of both the user's left and right foot. Foot support device 600 also includes a bottom surface 618 that is adapted to rest on any desirable surface such as, for example, the top of a mattress.

In this particular embodiment, part 602 and part 604 are hollow, thin-walled structures. The bottom of parts 602 and 604 (not shown) can be either open or closed. In either case, the bottom of parts 602 and 604 provide a surface for supporting foot support device 600. In the case of an open bottom, the lower edges of sidewalls 606 and 608 and backwall 610 form bottom surface 618. In the case of a closed bottom, a surface joining the lower edges of sidewalls 606 and 608 and backwall 610 form bottom surface 618.

In this particular embodiment, foot support 600 includes user instructions 620 which, in the example embodiment, are in the form of a label attached the outside of part 602 by some suitable means such as, for example, stitching, adhesive, etc. Like user instructions 108, 404, and 520, user instructions 620 can be presented to the user in various forms including, but not limited to, text printed or molded on part 602, a label attached to part 602, a separate sheet of paper having user instructions printed thereon, orally, etc.

Figure 7:
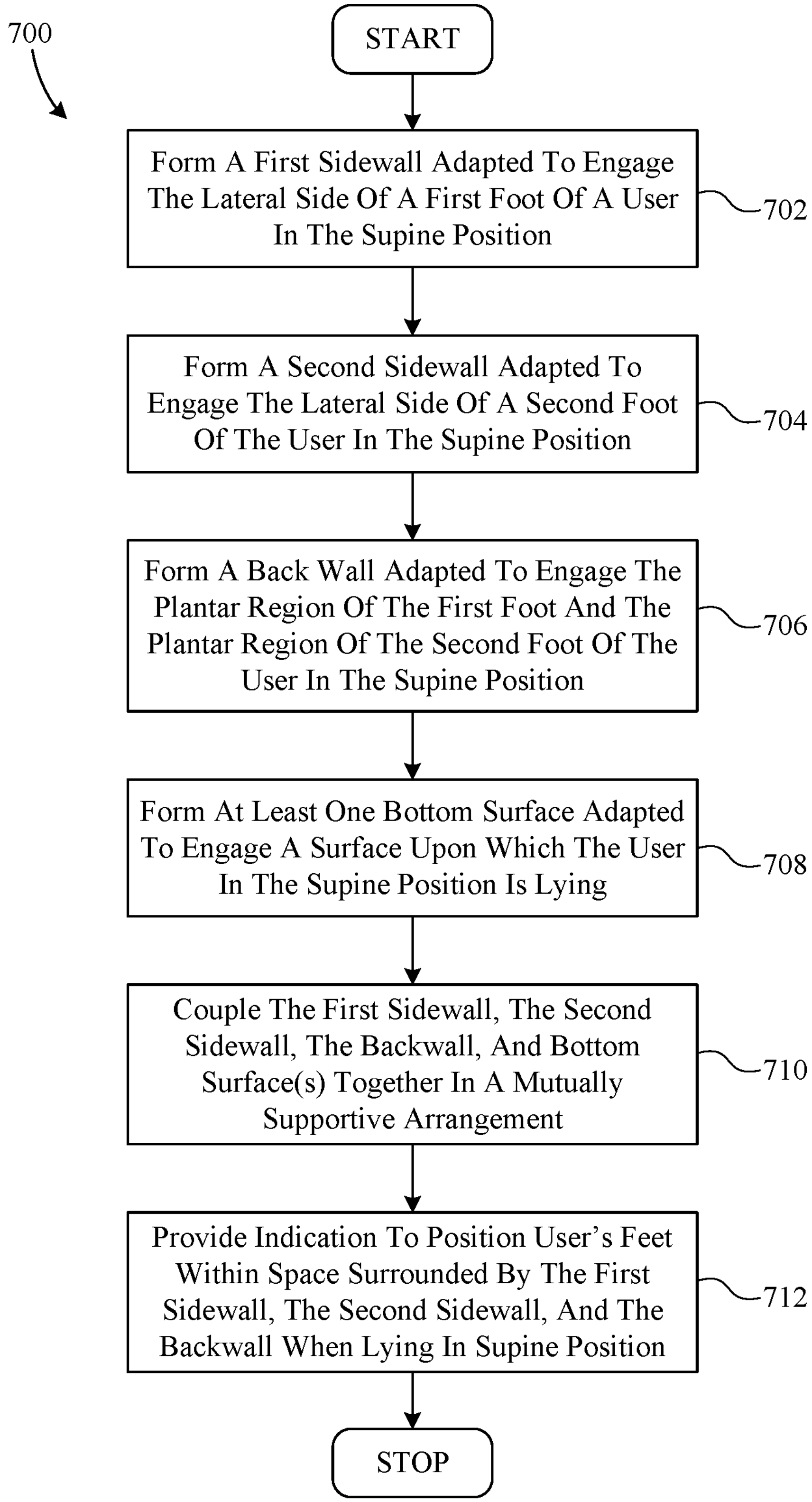
FIG. 7 is a flow chart summarizing a method for manufacturing a foot support device.

FIG. 7 is a flow chart summarizing one method 700 of manufacturing a foot support device. In a first step 702, a first sidewall adapted to engage the lateral side of a first foot of a user in a supine position is formed. Then, in a second step 704, a second sidewall adapted to engage the lateral side of a second foot of the user in a supine position is formed. Next, in a third step 706, a backwall adapted to engage the plantar region of the first foot and the plantar region of the second foot of the user in the supine position is formed. Then, in a fourth step 708, at least one bottom surface adapted to engage a surface upon which the user in the supine position is lying is formed. Next, in a fifth step 710, the first sidewall, the second sidewall, the backwall, and the bottom surface(s) are coupled together in a mutually supportive arrangement. Finally, in a sixth step 712, an indication is provided to position the feet of the user within the space surrounded by the first sidewall, the second sidewall, and the backwall when the user is lying in the supine position.

Figure 8:
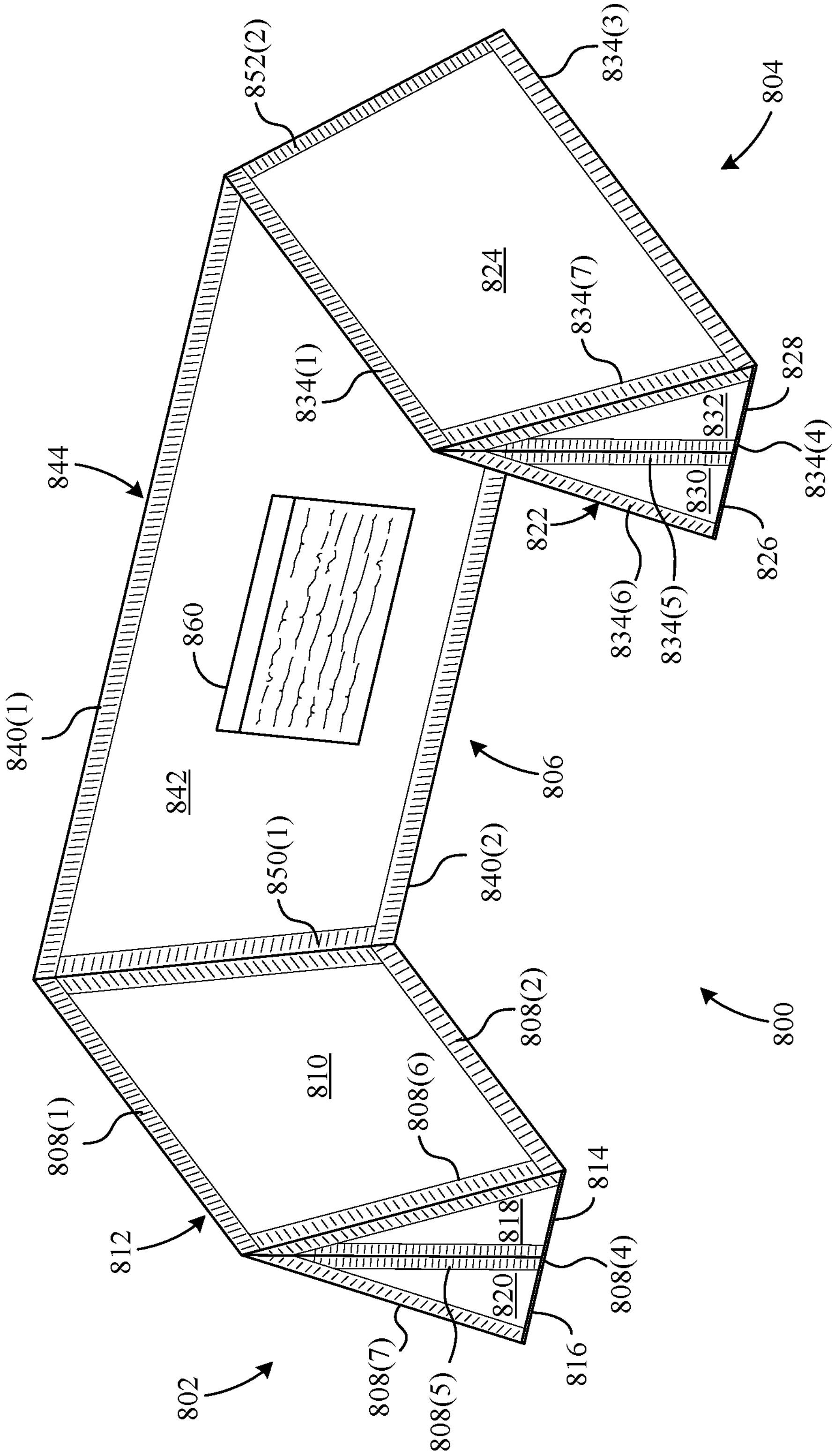
FIG. 8 is a perspective view showing a collapsible foot support device according to an exemplary embodiment of the invention.

FIG. 8 is a perspective view showing a collapsible foot support device 800 according to the present invention. Foot support device 800 is shown in its expanded configuration in FIG. 8, which enables foot support device 800 to receive and support the feet of a user as described above with respect to prior embodiments. However, as will be more described in more detail below, foot support device 800 is able to transition between the expanded configuration shown and a collapsed configuration for compact storage.

Foot support device 800 includes a first sidewall 802, a second sidewall 804, and a backwall 806. Sidewall 802, sidewall 804 and backwall 806 define a volume for receiving the feet of a user therein, while the user is lying supine on the same surface upon which foot support device 800 is resting. Additionally, the distal ends of sidewalls 802 and 804 define an opening through which the user's feet pass to be positioned within the volume defined by sidewalls 802 and 804 and backwall 106.

Figure 9A:
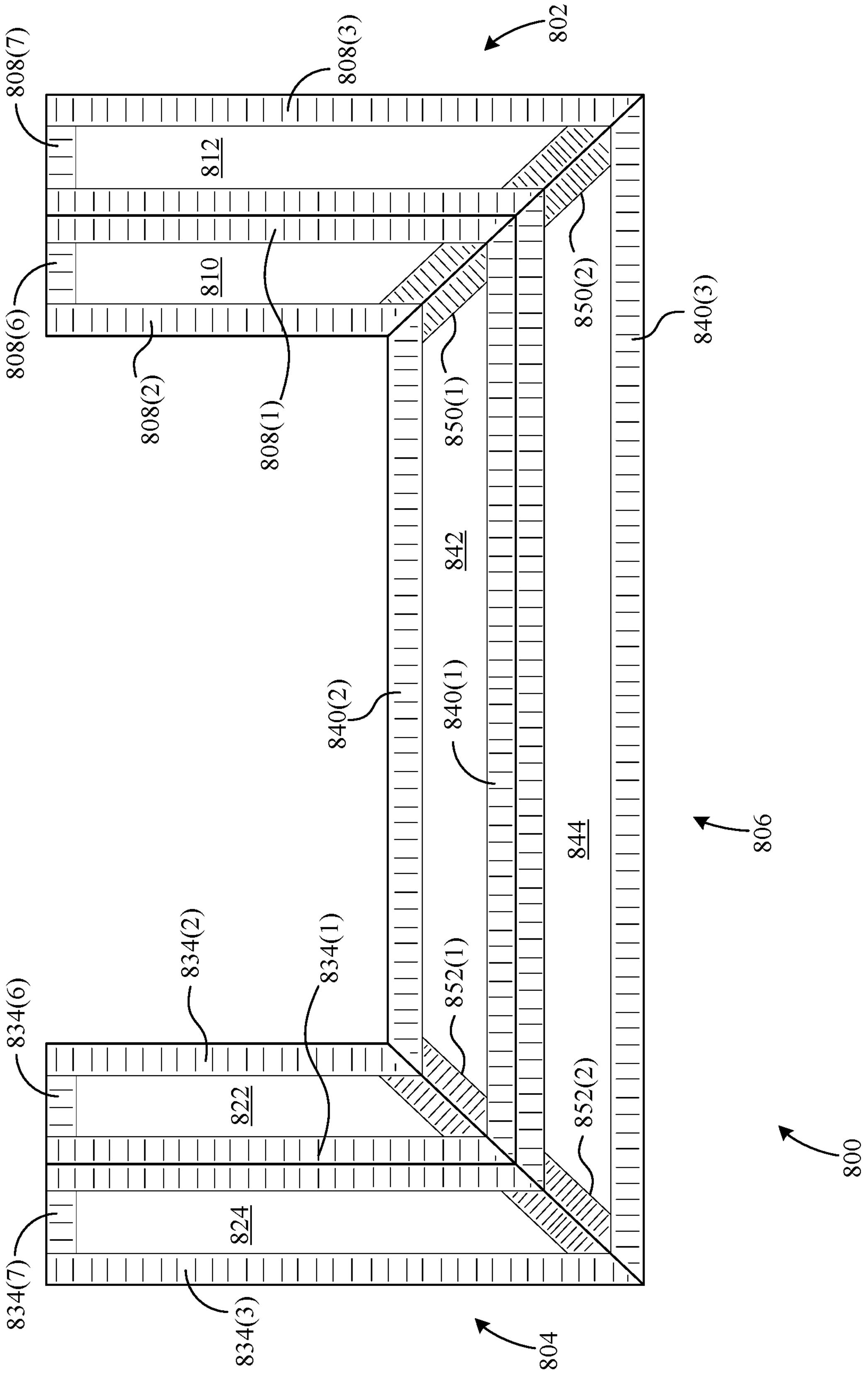
FIG. 9A is a top view of the foot support device of FIG. 8.
Figure 9B:
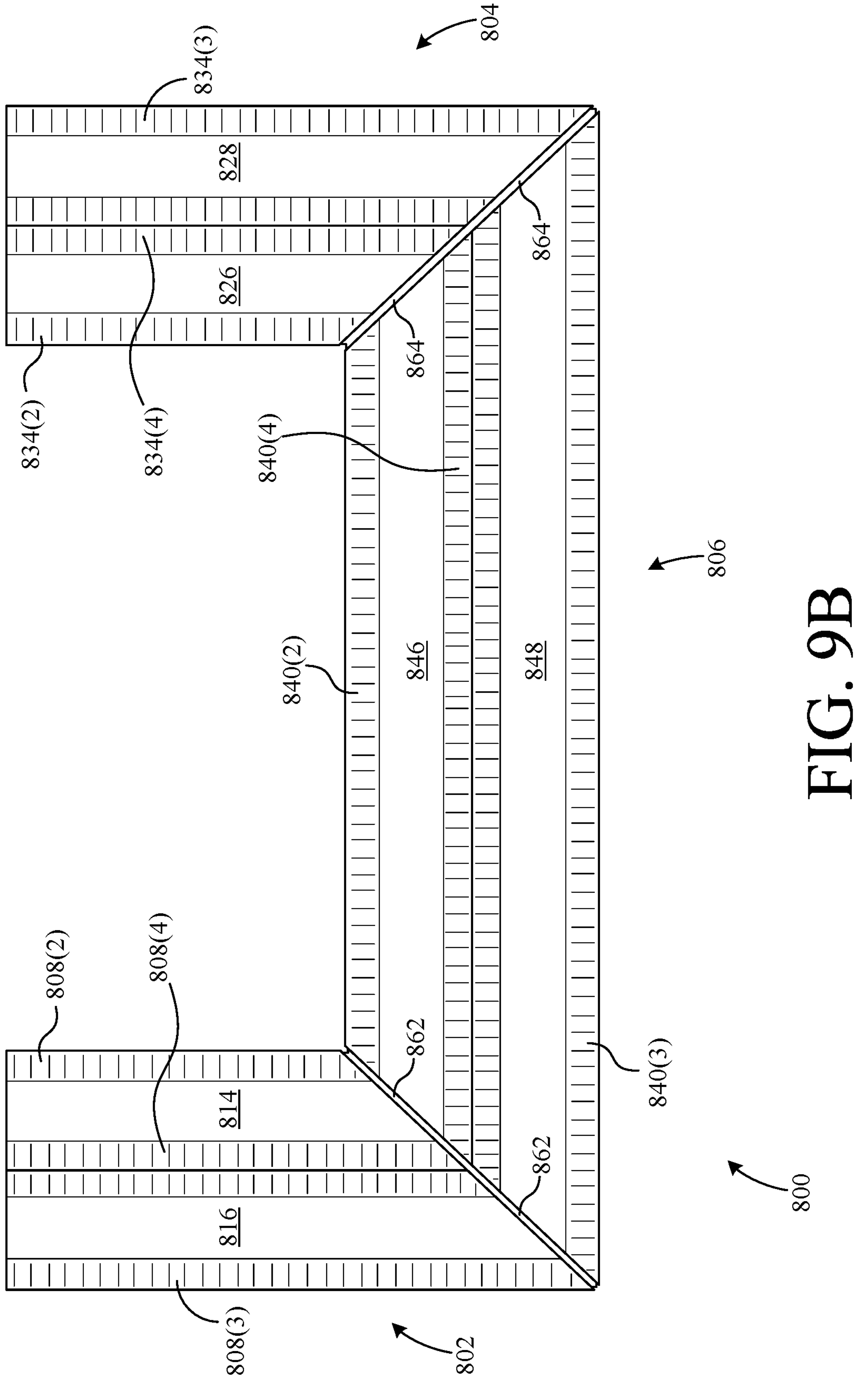
FIG. 9B is a bottom view of the foot support device of FIG. 8.

First sidewall 802 is comprised of a first plurality of panels movably coupled together via a first set of movable joints 808. In the embodiment shown, first sidewall 802 includes a first panel 810, a second panel 812 (FIG. 9A), a third panel 814, and a fourth panel 816. First sidewall 802 also includes a first distal panel 818 and second distal panel 820. First panel 810 and second panel 812 are movably coupled along their peak edges via a movable joint 808(1). First panel 810 is also movably coupled along its bottom edge to third panel 814 via movable joint 808(2). Similarly, second panel 812 is movably coupled along its bottom edge to fourth panel 820 via movable joint 808(3) (FIGS. 9A-9B). Third and fourth panels 814 and 816 are themselves movably coupled together via a movable joint 808(4) therebetween and, together, define a substantially flat (e.g., ignoring small surface variations between the panels, associated with movable joint(s), etc.) bottom surface of first sidewall 802 when foot support device 800 is in its expanded configuration. First and second distal panels 818 and 820 are movably coupled together via a movable joint 808(5) and are also movably coupled to first panel 810 and second panel 812 via movable joints 808(6) and 808(7), respectively.

Second sidewall 804 is comprised of a second plurality of panels movably coupled together via a second set of movable joints in substantially the same manner as first sidewall 802, except that second sidewall 804 is the mirror image of first sidewall 802. More specifically, the second plurality of panels making up second sidewall 804 includes a first panel 822 (FIG. 9A), a second panel 824, a third panel 826, a fourth panel 828, a first distal panel 830, and a second distal panel 832, which are movably coupled together via a second set of movable joints 834(1-7) (see also FIGS. 9A-9B).

Like the sidewalls, backwall 806 is constructed from a third plurality of panels movably coupled together via a third set of movable joints 840(1-4). More specifically, backwall 806 includes a first panel 842, a second panel 844 (FIG. 9A), a third panel 846 (FIG. 9B), and a fourth panel 848 (FIG. 9B). First panel 842 and second panel 844 are movably coupled along their peak edges via a movable joint 840(1). First panel 842 is also coupled to third panel 846 along its bottom edge via a movable joint 840 (2). With reference to FIGS. 9A and 9B, second panel 844, which defines an exterior surface of backwall 806, is movably coupled to fourth panel 848 via a movable joint 840(3), and third and fourth panels 846 and 848 are movably coupled via a movable joint 840(4). When foot support device 900 is in its expanded configuration, third panel 846 and fourth panel 848 define a substantially flat bottom surface of backwall 806.

The proximal ends of first sidewall 802 and second sidewall 804 are each coupled to lateral ends of backwall 806 by a fourth plurality of movable joints 850(1-2) and a fifth plurality of movable joints 852(1-2), respectively. More specifically, the proximal edges of first and second panels 810 and 812 of first sidewall 802 are coupled along a first set of short edges of first and second panels 842 and 844 of backwall 806 via movable joints 850(1) and 850(2) (FIG. 9A), respectively. Similarly, the proximal edges of first and second panels 822 and 824 of second sidewall 804 are coupled along another set of short edges of first and second panels 842 and 844 of backwall 806 via movable joints 852(1) (FIG. 9A) and 850(2), respectively. The fourth and fifth pluralities of movable joints 850 and 852 enables each of first sidewall 802 and second sidewall 804 to pivot relative to backwall 806 when foot support device 800 transitions from its expanded configuration to its collapsed configuration, and vice-versa.

In the present embodiment, each of movable joints 808 (1-7), 834(1-7), 840(1-4), 850(1-2), and 852 (1-2) comprises an adhesive sheet material (e.g., an adhesive tape, etc.) adhered to the outer surfaces of two adjacent panels that are being joined together along edges of those panels. For example, movable joint 850(1) movably couples the proximal edge of first panel 810 of first sidewall 802 along a short edge of first panel 842 of backwall 806. As another example, movable joint 808(5) flexibly couples distal panels 818 and 820 together along their respective longitudinal edges. Accordingly, movable joints 808, 834, 840, 850, and 852 enable their respective connected panels to move (rotate) and fold relative to one other, which in turn facilitates the collapsibility of foot support device 800.

The adhesive sheet material forming the movable joints provide advantage because its placement can be readily adjusted. For example, in some embodiments, it might be desirable to apply the adhesive sheet forming a movable joint (e.g., joint 808(1), etc.) to the inner surfaces of the panels being joined instead of, or in addition to, their outer surfaces as shown. In other cases, it might be desirable to form particular movable joints over or under other movable joints to get a desired overlap of the adhesive sheet material. For example, the adhesive tape forming movable joint 850(1) could be applied over, instead of under, the tape forming joints 808(1-2) and 840(1-2). These and other alterations are possible.

In the present embodiment, each of panels forming a portion of first sidewall 802, second sidewall 804, and backwall 806 is formed from a flat, rigid material such as paperboard, cardboard, corrugated cardboard, multi-wall board, plastic, metal, carbon fiber, etc. Indeed, the material used to construct the panels of collapsible foot support device 800 can be selected based on the desired support strength of device 800, the degree of collapsibility of device 800, etc. The invention provides an advantage, because the pluralities of panels described above can be formed (e.g., cut, molded, etc.) from the desired material and then those pluralities of panels can be assembled together (e.g., by the manufacturer, by the end-user, etc.) using the adhesive sheet material discussed above. Additionally, the foot support device 800 can be readily manufactured to have a desired expanded height (e.g., 18 inches) as discussed above.

Foot support device 800 also includes user instructions 860, which are printed on a label attached to panel 842 of backwall 806. In addition to the user instructions discussed above, user instructions 860 can also include instructions describing how to collapse and/or expand foot support device 800. User instructions 860 can also include instructions on how to assemble foot support device 800, for example, by indicating how to arrange and flexibly couple together the pluralities of panels associated with first sidewall 802, second sidewall 804, and backwall 806. Although user instructions 860 are depicted as being text printed on a label that is permanently attached to foot support device 800, it should be understood that user instructions 860 can be presented to the user in any effective form as discussed above. Instructions 860 are omitted from subsequent figures of foot support device 800 so as not to unnecessarily obscure other features.

In its expanded configuration, foot support device 800 is adapted to be supported on the same flat surface as the user's feet and that the user is lying supine on. As in prior embodiments, the user's feet can be placed within the opening defined by sidewalls 802 and 804 and backwall 806. Additionally, the interior surfaces of sidewalls 802 and 804 defined by panels 810 and 812, respectively, are inclined to support the lateral sides of the user's feet and to allow some, but not excessive, abduction of the feet as described above. Similarly, panel 842 of backwall is inclined to allow some, but not excessive, plantarflextion of the left and right feet of the user.

The heights of sidewall 802, sidewall 804, and backwall 806 are selected to retain the bedding draped over foot support device 800 above, and out of contact with, the user's feet. In the expanded configuration, distal panels 818 and 820 of first sidewall 802 and distal panels 830 and 832 of second sidewall 804 are disposed in a substantially co-planar fashion and help support against the weight of such bedding placed over foot support device 800. These distal panels also help prevent panels 810 and 812 of first sidewall 802 and panels 822 and 824 of second sidewall 804, respectively, from bowing outward and potentially separating, bending, and/or collapsing under the weight of the bedding.

FIG. 9A is a top view of foot support device 800 in its expanded configuration. FIG. 9A shows various panels (e.g., second panel 844 of backwall 806, etc.) and movable joints (e.g., movable joint 850(2), movable joint 852(1), etc.) not shown in FIG. 8. Additionally, FIG. 9A illustrates how panels 810, 812, 822, 824, 842, and 844 are each trapezoidal in shape. Additionally, second panels 812, 824, and 844 of first sidewall 802, second sidewall 804, and backwall 806 are longer than first panels 810, 822, and 842, respectively.

FIG. 9B is a bottom view of foot support device 800 in its expanded configuration. FIG. 9B shows how third panel 814 and fourth panel 816 of first sidewall 802 are flexibly joined by movable joint 808(4) and define a flat bottom surface of first sidewall 802 in its expanded configuration. Similarly, third panel 826 and fourth panel 828 of second sidewall 804 are flexibly joined by movable joint 834(4) and define a flat bottom surface of second sidewall 804 in its expanded configuration. Likewise, the third and fourth panels 846 and 848 of backwall 806 are flexibly joined by movable joint 840(4) therebetween and define a flat bottom surface of backwall 806 in its expanded configuration.

The movable joints between the respective bottom panels and the vertically-disposed panels, prevent the vertical panels from moving outward under the downward force of the bedding. For example, third and fourth panels 814 and 816 are connected together by movable joint 808(4), and are further connected to first and second panels 810 and 812 by movable joints 808(2) and 808(3), respectively. In the expanded configuration, the bottom panels 814 and 816 and movable joints 808(2-4) maintain first and second panels 810 and 812 a predetermined width apart at the base of first sidewall 802, and prevent the first and second panels 810 and 812 from splaying apart under the weight of bedding. The same is true of the bottom panels and associated movable joints of second sidewall 804 and backwall 806.

Notably, FIG. 9B also shows how foot support device 800 is free of movable joints directly connecting third and fourth panels 846 and 848 of backwall 806 to either of third and fourth panels 814 and 816 of first sidewall 802, as illustrated by gap 862, or to either of third and fourth panels 826 and 828 of second sidewall 804, as illustrated by gap 864. This feature enables the bottom surfaces of each of first sidewall 802, second sidewall 804, and backwall 806 to fold outward and separate when foot support device 800 is collapsed and sidewalls 802 and 804 pivot with respect to backwall 806 as discussed in more detail below.

Figure 10A:
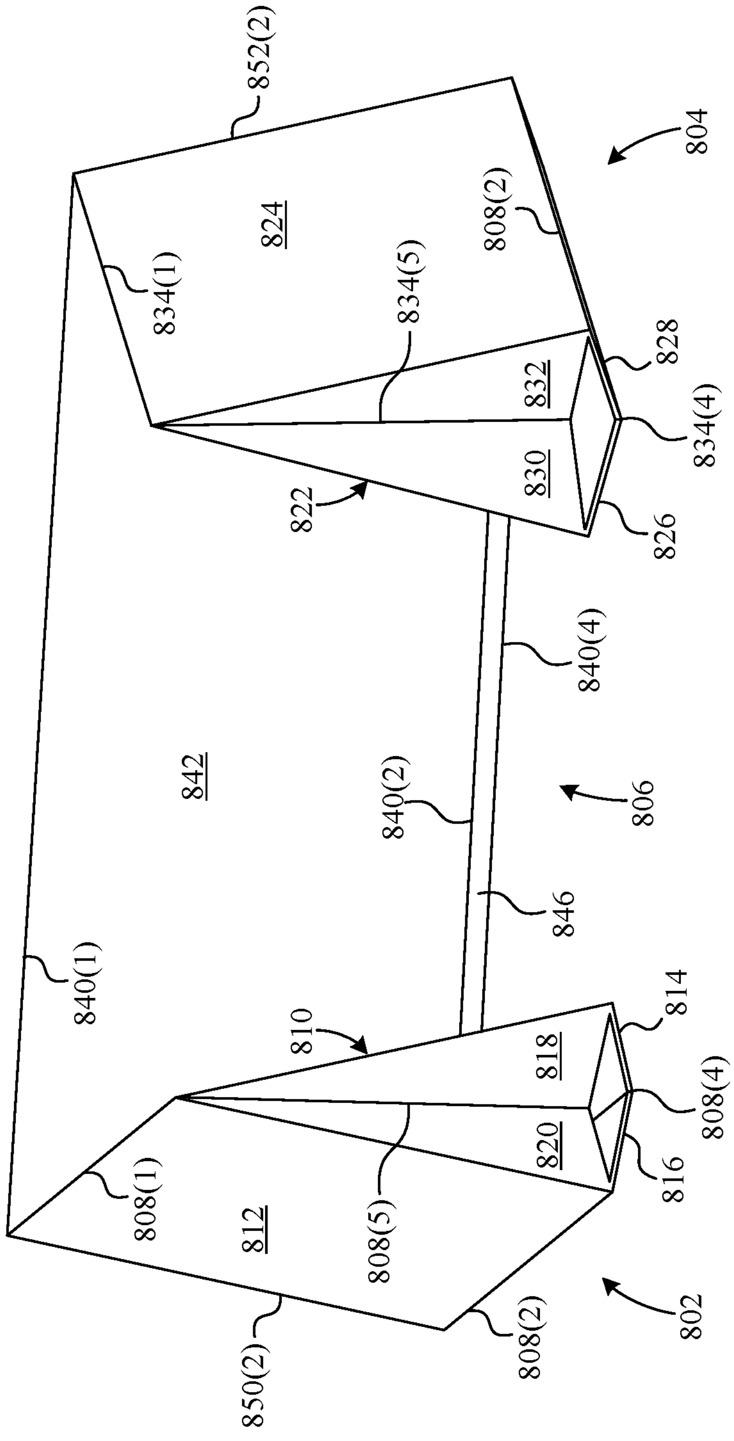
FIG. 10A is a perspective view showing a first stage of collapse of the foot support device of FIG. 8.
Figure 10B:
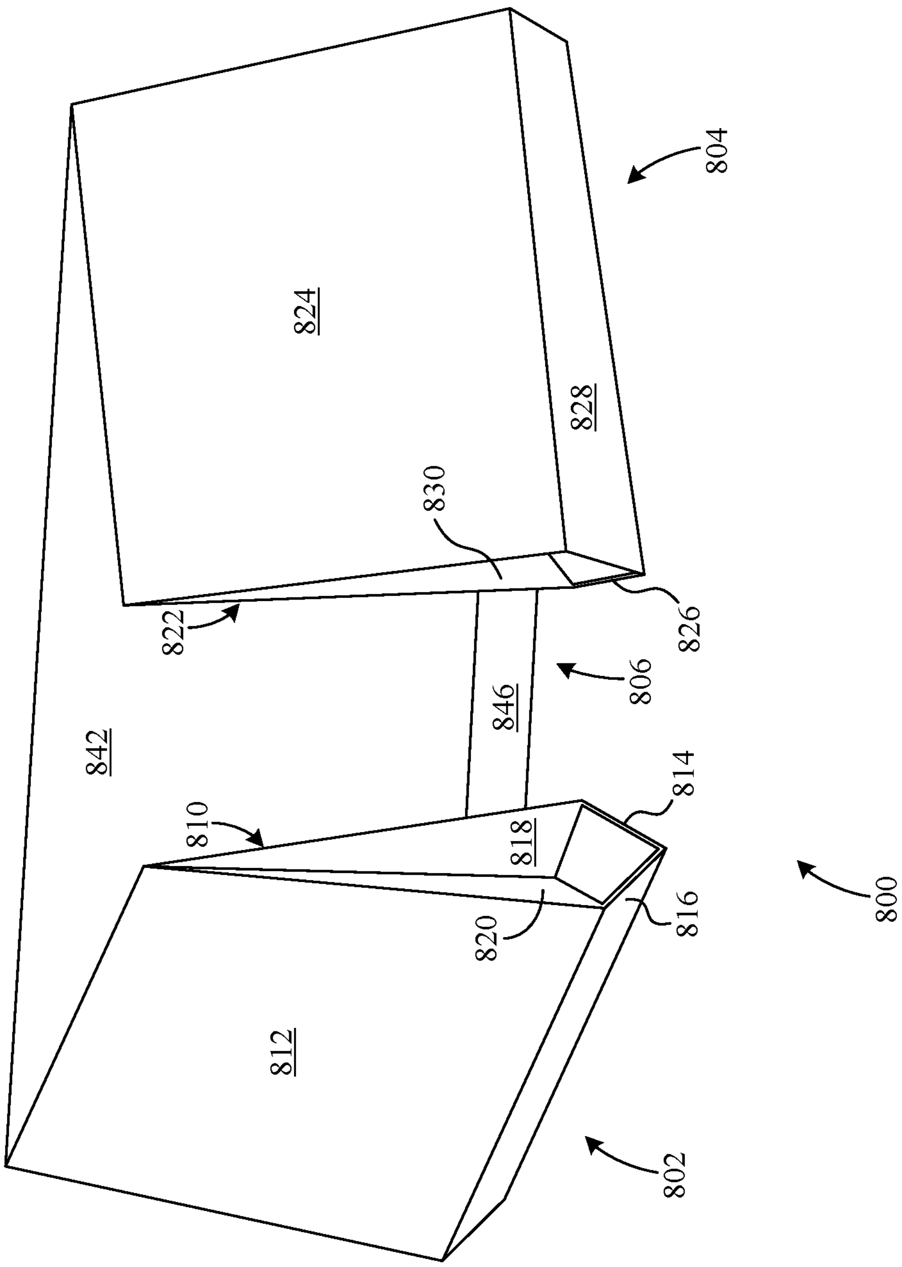
FIG. 10B is a perspective view showing a second stage of collapse of the foot support device of FIG. 8.
Figure 10C:
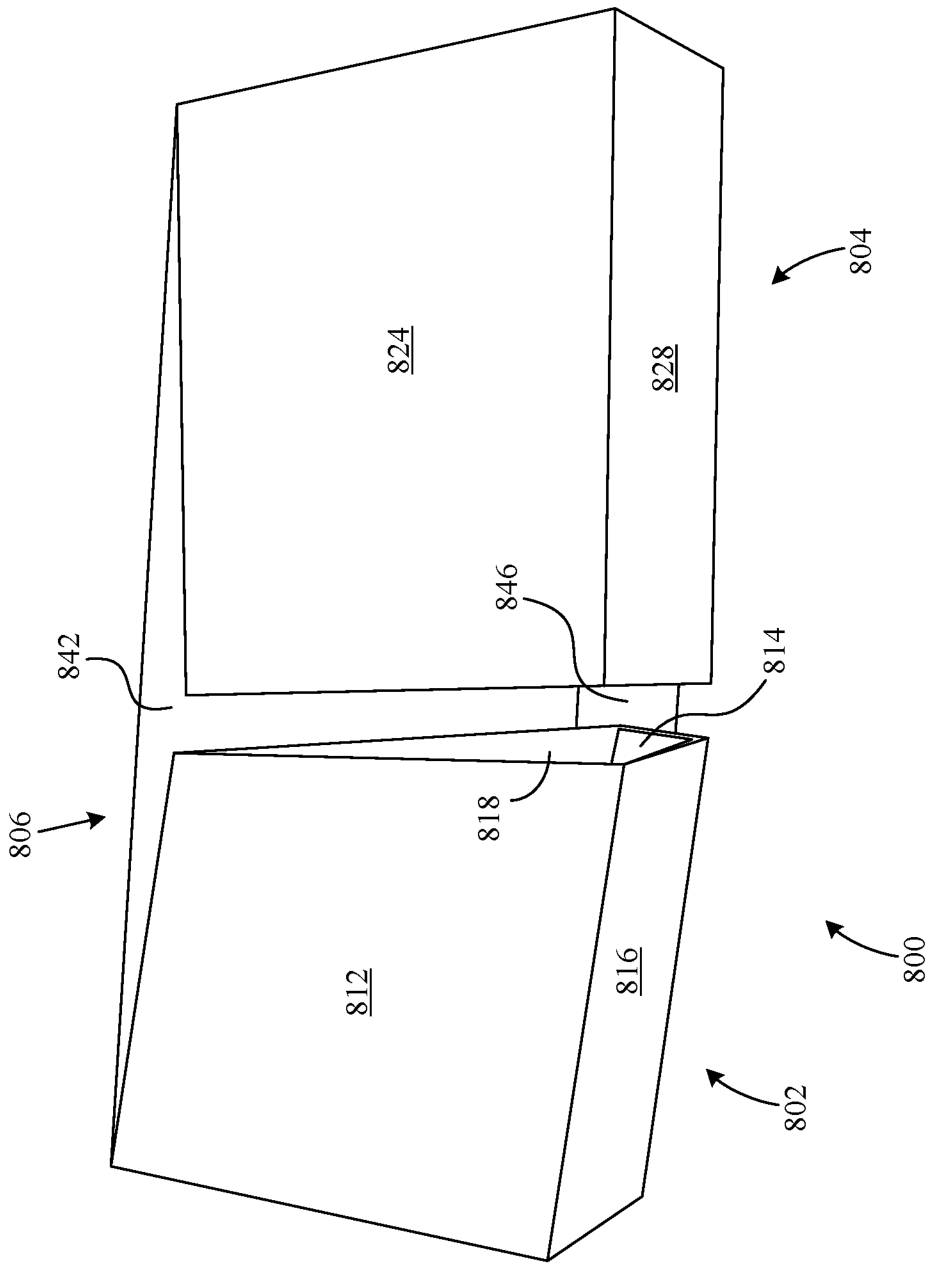
FIG. 10C is a perspective view showing a third stage of collapse of the foot support device of FIG. 8.

FIGS. 10A-10C show foot support device 800 at various stages of collapse. In FIGS. 10A-10C the hatching illustrating the movable joints 808, 834, 840, 850, and 852 has been removed to more clearly illustrate how the various panels of foot support device 800 collapse relative to each other.

FIG. 10A shows a first stage of collapse, in which panels 810 and 812 of first sidewall 802, panels 822 and 824 of second sidewall 804, and panels 842 and 844 of backwall 806 begin to come together in a clamshell fashion about movable joints 808(1), 834(1), and 840(1) respectively. Additionally, bottom panels 814 and 816 of first sidewall 802, bottom panels 826 and 828 of second sidewall 804, and bottom panels 846 and 848 of backwall 806 begin to fold towards each other and outward (downward) via movable joints 808(2-4), movable joints 834(2-4), and movable joints 840(2-4), respectively. Distal surfaces 818 and 820 and distal surfaces 830 and 832 also fold inward along joints 808(5) and 834(5), respectively, to accommodate the flattening of sidewalls 802 and 804. As a result, first and second sidewalls 802 and 804 begin to pivot inward towards the first panel 842 of backwall 806 via movable joints 850(1-2) and 852(1-2), such that the angles between the inner surfaces of each of sidewalls 802 and 804 and the inner surface of backwall 806 become more acute. Thus, first sidewall 802, second sidewall 804, and backwall 806 all begin to flatten and progress towards a collapsed configuration of foot support device 800.

FIG. 10B shows a second stage of collapse, in which bottom panels 814 and 816 of first sidewall 802, bottom panels 826 and 828 of second sidewall 804, and bottom panels 846 and 848 of backwall 806 have mostly folded out. Distal panels 818 and 820 of first sidewall 802 and distal panels 830 and 832 of second sidewall 804 have also folded further inward. As a result, panels 810 and 812 of first sidewall and panels 822 and 824 of second sidewall 804 have flattened further and rotated further inward. Panels 842 and 844 of backwall 806 will have also flattened further. FIG. 10B also illustrates how the cross-sections of sidewalls 802 and 804 and backwall 806 become kite-shaped as foot support device 800 collapses. In contrast, sidewalls 802 and 804 and backwall 806 have triangular cross-sections when foot support device is in an expanded configuration.

FIG. 10C shows a third stage of collapse in which first sidewall 802, second sidewall 804, and backwall 806 are substantially collapsed and flattened such that foot support device 800 is in its collapsed configuration. In its collapsed configuration, foot support device 800 can be readily stored in a suitcase, or other small space.

Figure 11:
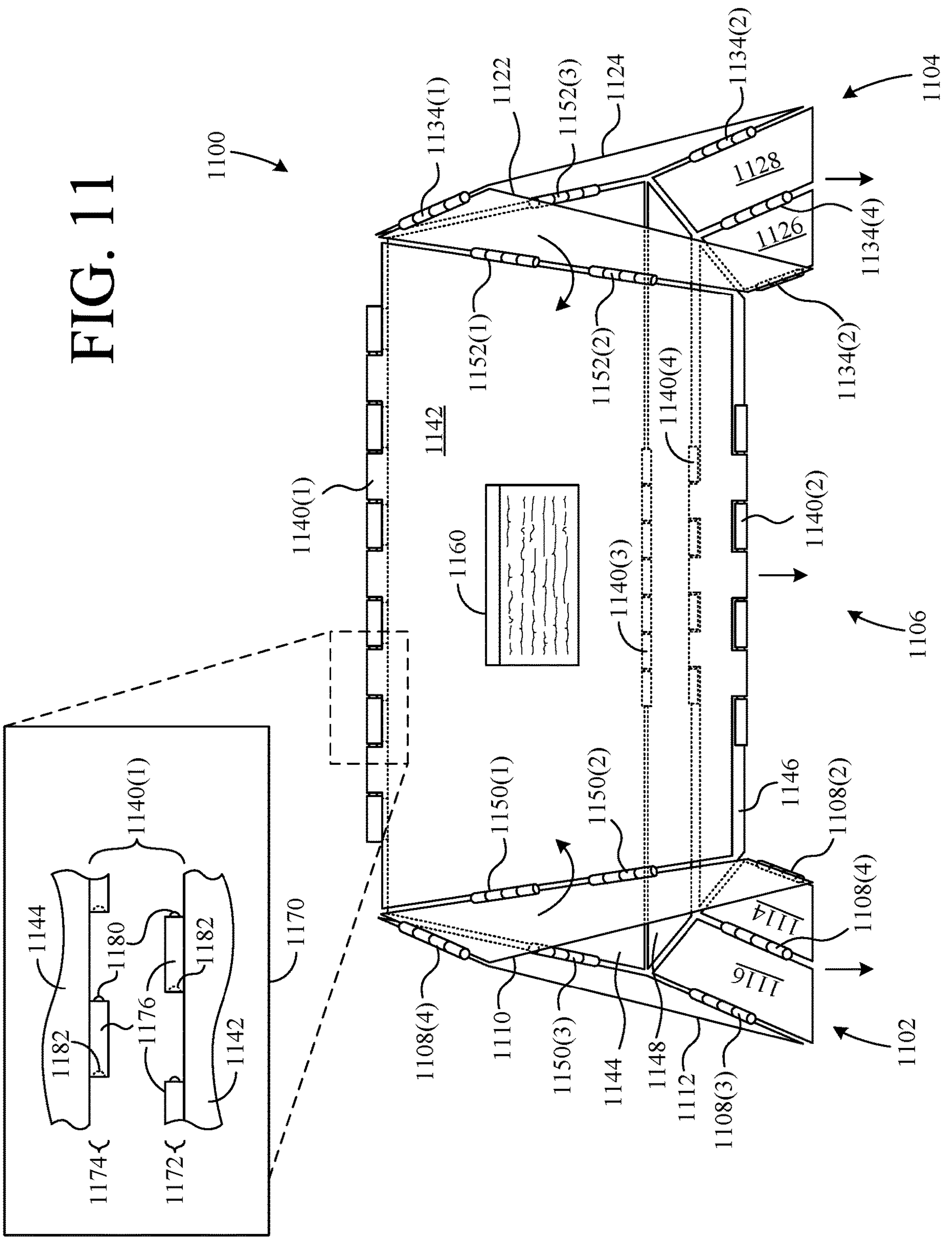
FIG. 11 is a perspective view showing a collapsible foot support device according to another embodiment of the invention.

FIG. 11 shows a collapsible foot support device 1100 in an expanded configuration according to another embodiment of the invention. Like device 800, foot support device 1100 includes a first sidewall 1102 and a second sidewall 1104, which are movably coupled to a backwall 1106 such that backwall 1106 is disposed between sidewalls 1102 and 1104.

First sidewall 1102 includes a first panel 1110, a second panel 1112, a third panel 1114, and fourth panel 1116, which are movably coupled together via a plurality of movable joints 1108(1-4). Panels 1110, 1112, 1114, and 1116 have the same general shapes and functions as panels 810, 812, 814, and 816, respectively, of foot support device 800. Similarly, second sidewall includes a first panel 1122, a second panel 1124, a third panel 1126, and a fourth panel 1128, which are movably coupled together via a plurality of movable joints 1134(1-4). Panels 1122, 1124, 1126, and 1128 have the same general shapes and functions as panels 822, 824, 826, and 828, respectively, of foot support device 800. Backwall 1106 also comprises four panels, including a first panel 1142, a second panel 1144, a third panel 1146, and a fourth panel 1148, which are movably coupled together by a plurality of movable joints 1140(1-4). Panels 1142, 1144, 1146, and 1148 have the same general shapes and functions as panels 842, 844, 846, and 848, respectively, of foot support device 800. Portions of some panels are shown in phantom in FIG. 11.

First and second sidewalls 1102 and 1104 are also pivotally coupled to backwall 1106 via movable joints 1150(1-3) and movable joints 1152(1-3), respectively. More particularly, first panel 1110 of first sidewall 1102 is coupled to first panel 1142 of backwall via movable joints 1150(1) and 1150(2), whereas second panel 1112 of sidewall 1102 is coupled to second panel 1144 of backwall 1144 via movable joint 1152(3). On the opposite end of backwall 1106, first and second panels 1122 and 1124 of sidewall 1104 are pivotally coupled to first and second panels 1142 and 1144 of backwall 1106 via movable joints 1152(1-2) and 1152(3), respectively. Movable joints 1150 and 1152 enable first and second sidewalls 1102 and 1104 to pivot toward and away from backwall 1106 in the direction of the arrows, when foot support device 1100 transitions between collapsed and expanded configurations, respectively.

In the present embodiment, each of movable joints 1108(1-4), 1134(1-4), 1140(1-4), 1150(1-3), and 1152(1-3) comprises a hinge configured to rotatably connect two adjacent panels together, such as shown in the detail 1170 of hinge 1140(1). Detail 1170 shows that panels 1142 and 1144 include respective complementary hinge portions 1172 and 1174. Each hinge portion 1172 and 1174 comprises a plurality of cylindrical bodies 1176, where each cylindrical body 1176 includes a protrusion 1180 at one end and a dimple 1182 at the other. The cylindrical bodies 1176 of hinge portion 1172 are offset from the cylindrical bodies 1176 of hinge portion 1174, such that cylindrical bodies 1176 can be pushed into engagement to rotatably couple panels 1142 and 1144 together. More particularly, pushing the hinge portions 1172 and 1174 together causes the protrusions 1180 and dimples 1182 of adjacent cylindrical bodies 1176 on the opposing panels to engage one another and rotatably connect together. Thus, the structures of hinge portions 1172 and 1174 enable two panels to be quickly connected together. In an alternative embodiments, other hinge structures can be used. For example, the cylindrical bodies 1176 can include bores to receive a hinge pin therethrough after the cylindrical bodies of two panels are aligned together.

In the present embodiment, the each of the panels associated with sidewalls 1102 and 1104 and each of the panels associated with backwall 1106 are formed (e.g., molded, stamped, etc.) from a plastic and have a uniform thickness (e.g., in the range of 1/16 to 1/8 of an inch, etc.) outside of their hinge regions. The specific wall thickness will depend on the type of material used to make the panels. Additionally, in the present embodiment the cylindrical bodies 1176 of the panel's hinge portions(s) 1172 and 1174 are formed (e.g., molded) integrally with the panel.

As with foot support device 800, panels 1114, 1116, 1126, 1128, 1146, and 1148 define respective bottom surfaces of first sidewall 1102, second sidewall 1104, and backwall 1106. Together, these bottom surfaces support foot support device 1100 in its expanded configuration on a substantially-flat surface. A user lying supine on the same flat surface can place his/her feet through the opening defined by sidewalls 1102 and 1104. The substantially rigid structure of sidewalls 1102 and 1104 and backwall 1106 in the expanded configuration is thus capable of supporting bedding placed over foot support device 1100 from coming into contact with the user's feet. Sidewalls 1102 and 1104 are again slightly inclined to support the lateral sides of the user's feet and to allow some abduction as discussed above. Backwall 1106 is also slightly inclined to allow some plantarflexion of the user's feet.

A user can collapse foot support device 1100 by moving panels 1114 and 1116, panels 1126 and 1128, and panels 1146 and 1148 outward (downward) in the direction of the arrows. This causes panels 1110 and 1112 of first sidewall 1102, panels 1122 and 1124 of second sidewall 1104, and panels 1142 and 1144 of backwall 1106 to collapse toward each other and flatten as discussed above with reference to FIGS. 10A-10C. Additionally, as sidewalls 1102 and 1104 and backwall 1106 are flattened, sidewalls 1102 and 1104 pivot inward toward backwall 1106. When sidewall 1102, sidewall 1104, and backwall 1106 are fully flattened, sidewalls 1102 and 1104 will also be fully folded inward, rendering device 1100 substantially flat. In this collapsed configuration, device 1100 is very transportable and can easily be packed in luggage. If even more collapsing is needed, some hinges can be separated. For example, hinges 1150(1-3) and 1152(1-3) can be pulled apart such that sidewalls 1102 and 1104 are removed from backwall 1106. The individual sidewall and backwall components can then be collapsed independently and stored, for example, in different pieces of luggage. In such a case, hinges 1150 and 1152 can be reconnected (aligned and pushed together) when returning the device 1100 to its expanded configuration.

As in prior embodiments, foot support device 1102 can also include user instructions 1160, which are printed on a label attached to panel 1142 of backwall 1106. In addition to the user instructions discussed above, user instructions 1160 can also include instructions describing how to assemble, collapse, and/or expand foot support device 1100.

Figure 12:
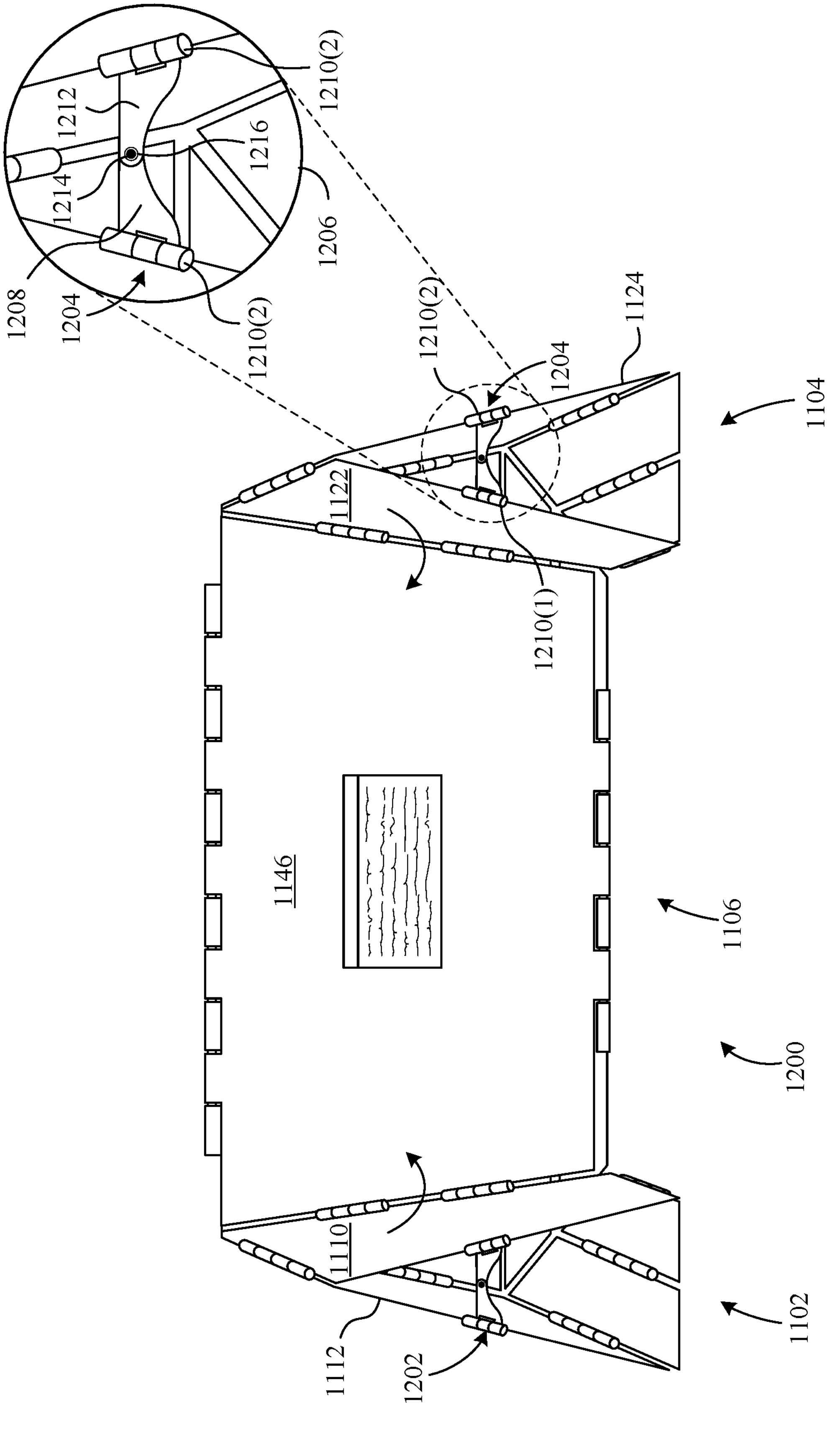
FIG. 12 is a perspective view showing a collapsible foot support device according to yet another embodiment of the invention.

FIG. 12 shows a collapsible foot support device 1200 in an expanded configuration according to yet another embodiment of the invention. Foot support device 1200 includes a first sidewall 1102, a second sidewall 1104, and a backwall 1106, which are substantially similar to those described above with respect to FIG. 11, except as otherwise noted.

In this embodiment, first sidewall 1102 and second sidewall 1104 include respective retainers 1202 and 1204. Retainer 1202 is coupled between first and second panels 1110 and 1112 of first sidewall 1102 and functions to maintain those panels a predetermined distance apart when device 1200 is in the expanded configuration shown. Similarly, retainer 1204 is coupled between first and second panels 1122 and 1124 of second sidewall 1104 and functions to maintain those panels a predetermined distance apart in the expanded configuration. FIG. 12 includes a detail 1206, showing retainer 1204 in greater detail. Retainers 1202 and 1204 are substantially similar, so elements of retainer 1204 described in detail 1206 apply equally to retainer 1202.

Retainer 1204 includes a first arm 1208, which is rotatably coupled to first panel 1122 of second sidewall 1104 via a movable joint (hinge) 1210(1), and a second arm 1212, which is rotatably coupled to second panel 1124 via a hinge 1210(2). First arm 1208 includes a fastener 1214 (e.g., a post, hook, etc.) near its distal end, which is configured to selectively engage a complementary fastener 1216 (e.g., an aperture, hook, etc.) formed near the distal end of second arm 1212. When post 1214 and aperture 1216 are engaged, first and second arms 1208 and 1212 are connected together and function to keep first panel 1122 and second panel 1124 a predetermined distance apart.

In other words, when retainers 1202 and 1204 are engaged, they maintain sidewalls 1102 and 1104 and backwall 1106 in their expanded configurations. Additionally, when retainers 1202 and 1204 are engaged, they function to prevent panels 1110 and 1112 of first sidewall 1102 and panels 1122 and 1124 of second sidewall 1104, respectively, from bowing and potentially separating under the downward pressure from bedding placed over foot support device 1200.

Figure 13:
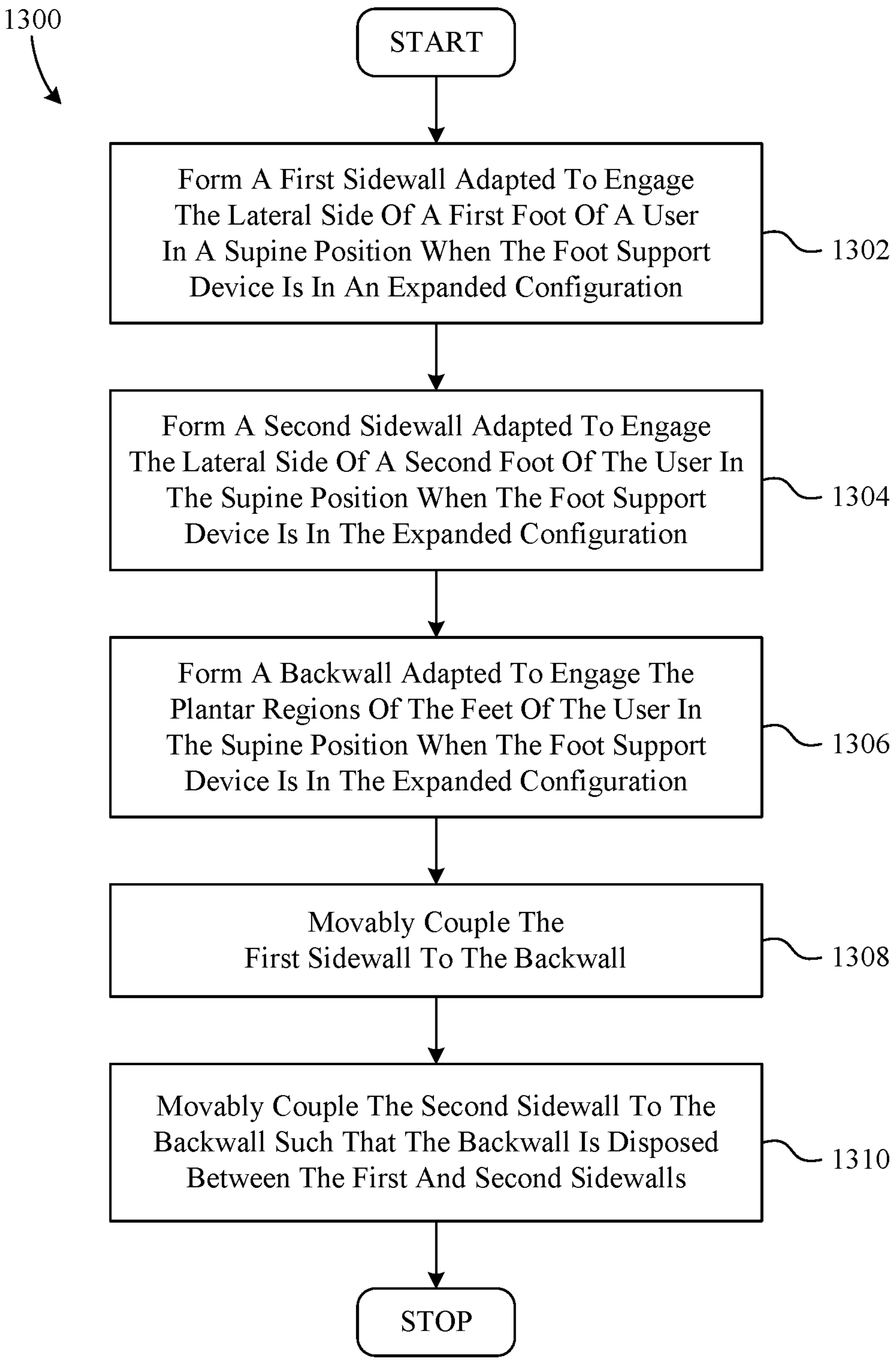
FIG. 13 is a flow chart summarizing a method for manufacturing a collapsible foot support device.

FIG. 13 is a flow chart summarizing a method for manufacturing a collapsible foot support device according to the invention. In a first step 1302, a first sidewall is formed, which is adapted to engage the lateral side of a first foot of a user in a supine position when the foot support device is in the expanded configuration. In a second step 1304, a second sidewall is formed, which is adapted to engage the lateral side of a second foot of the user in the supine position when the foot support device is in the expanded configuration. In a third step 1306, a backwall is formed, which is adapted to engage the plantar region of the first foot and the plantar region of the second foot of the user in the supine position. In a fourth step 1308, the first sidewall is movably coupled to the backwall, and in a fifth step 1310, the second sidewall is movably coupled to the backwall such that the backwall is disposed between the first and second sidewalls.

In a particular method, step 1302 includes providing a first plurality of panels, step 1304 includes providing a second plurality of panels, and step 1306 includes providing a third plurality of panels. In a more particular method, step 1302 further includes assembling the first plurality of panels via a first plurality of movable joints to form the first sidewall, and step 1304 includes assembling the second plurality of panels via a second plurality of movable joints to form the second sidewall. Additionally, in the more particular method, step 1306 further includes assembling the third plurality of panels via a third plurality of movable joints to form the backwall.

The description of particular embodiments of the present invention is now complete. Many of the described features may be substituted, altered or omitted without departing from the scope of the invention. For example, alternative moveable joints (e.g., rubber joints), may be substituted for the flexible joints and hinges of devices 800 and 1100, respectively. Additionally, the first and/or second sidewalls of the foot support can be made to fold outward, instead of inward, thereby decreasing the thickness, but increasing the length, of the collapsed foot support devices 800, 1100, and 1200. As yet another example, foot support 100 and/or foot support 500 can also be inflatable structures. These and other deviations from the particular embodiments shown will be apparent to those skilled in the art, particularly in view of the foregoing disclosure.

I claim:

1. A foot support device comprising:

an inflatable structure including a first sidewall, a second sidewall, a backwall, and a bottom surface; and wherein said backwall includes a continuous interior surface extending from a bottom edge of said backwall to a top edge of said backwall and from a first side edge of said backwall to a second side edge of said backwall, said interior surface being disposed to engage the plantar regions of a first foot and a second foot of a user in a supine position when said foot support device is inflated;

said first sidewall is coupled to said backwall, said first sidewall having a continuous interior surface extending from a bottom edge of said first sidewall to a top edge of said first sidewall and from a first side edge of said first sidewall to a second side edge of said first sidewall, said first side wall being disposed to engage the lateral side of said first foot of said user in said supine position when said foot support device is inflated;

said second sidewall is coupled to said backwall such that said backwall is disposed between said first sidewall and said second sidewall, said second sidewall having a continuous interior surface extending from a bottom edge of said second sidewall to a top edge of said second sidewall and from a first side edge of said second sidewall to a second side edge of said second sidewall, said second sidewall being disposed with respect to said first sidewall to engage the lateral side of said second foot of said user in said supine position when said foot support device is inflated; and a first portion of said bottom surface is coupled to said first sidewall, a second portion of said bottom surface is coupled to said second sidewall, and a third portion of said bottom surface is coupled to said backwall, said bottom surface disposed to support said first sidewall, said second sidewall, and said backwall on a surface upon which said feet of said user are resting resting;

said interior surface of said first sidewall faces toward said interior surface of said second sidewall and is inclined to face slightly upward to allow some abduction of one of said user's feet;

said interior surface of said second sidewall faces toward said interior surface of said first sidewall and is inclined to face slightly upward to allow some abduction of the other of said user's feet;

said first sidewall includes an exterior surface;

a portion of said exterior surface of said first sidewall is disposed in a first plane;

a portion of said interior surface of said first sidewall is disposed in a second plane;

said second plane is oriented at an acute angle with respect to said first portion of said bottom surface;

said first plane is oriented at an acute angle with respect to said second plane;

said second sidewall includes an exterior surface;

a portion of said exterior surface of said second sidewall is disposed in a third plane;

a portion of said interior surface of said second sidewall is disposed in a fourth plane;

said fourth plane is oriented at an acute angle with respect to said second portion of said bottom surface; and said third plane is oriented at an acute angle with respect to said fourth plane.

2. The foot support of claim 1, wherein said interior surface of said backwall is inclined to face slightly upward to allow some plantarflexion of said user's feet.

3. The foot support of claim 2, wherein said foot support device is formed from flexible and resilient material.

4. The foot support of claim 3, wherein said foot support device is formed from hypoallergenic material.

5. The foot support of claim 1, wherein said interior surface of said backwall is inclined to face slightly upward to allow some plantarflexion of said user's feet.

6. The foot support of claim 1, wherein said foot support device is formed from flexible and resilient material.

7. The foot support of claim 6, wherein said foot support device is formed from hypoallergenic material.

8. The foot support of claim 1, wherein said foot support device is formed from hypoallergenic material.

9. The foot support of claim 1, further comprising a removable cover.

10. The foot support of claim 9, wherein said removable cover is formed from hypoallergenic material.

11. The foot support of claim 1, wherein said first sidewall, said second sidewall, and said backwall are integral parts of a single structure.

12. The foot support of claim 1, wherein:

said backwall includes a first portion connected to said first sidewall;

said backwall includes a second portion connected to said second sidewall;

said first sidewalland first portion of said backwall are integral parts of a first discrete structure; and said second sidewall and said second portion of said backwall are integral parts of a second discrete structure.

13. The foot support of claim 1, wherein:

said first sidewall extends in a first direction;

said second sidewall extends in a second direction; and said first direction is parallel to said second direction.

14. The foot support of claim 13, wherein said backwall extends in a third direction perpendicular to said first direction and said second direction.

15. The foot support of claim 1, wherein:

said inflatable foot support includes a top surface coupled to said first sidewall, said second sidewall, and said backwall;

said top surface includes a first portion coupled to said first sidewall;

said top surface includes a second portion coupled to said second sidewall;

said bottom surface includes a first portion coupled to said first sidewall;

said bottom surface includes a second portion coupled to said second sidewall;

said first portion of said bottom surface is wider than said first portion of said top surface; and said second portion of said bottom surface is wider than said second portion of said top surface.

16. The foot support of claim 15, wherein:

said bottom surface includes a third portion coupled to said backwall;

said top surface includes a third portion coupled to said backwall; and said third portion of said bottom surface is wider than said third portion of said top surface.

17. The foot support of claim 1, wherein:

said inflatable foot support includes a top surface coupled to said first sidewall, said second sidewall, and said backwall;

said top surface includes a first portion coupled to said backwall;

said bottom surface includes a first portion coupled to said backwall; and said first portion of said bottom portion is wider than said first portion of said top surface.

18. The foot support device of claim 1, further comprising instructions to said user to position said feet of said user between said first sidewall and said second sidewall while in said supine position.

19. The foot support device of claim 1, wherein:

said inflatable foot support includes a top surface coupled to said first sidewall, said second sidewall, and said backwall; and the vertical distance between said top surface and said bottom surface is at least 18 inches.

20. The foot support device of claim 1, wherein:

said first sidewall has a first height;

said second sidewall has a second height;

said third sidewall has a third height; and said first height, said second height, and said third height are substantially the same.

* * * * *